United States Patent
Chen et al.

(10) Patent No.: US 10,330,891 B2
(45) Date of Patent: Jun. 25, 2019

(54) OPTICAL IMAGE LENS ASSEMBLY, IMAGE CAPTURING DEVICE AND ELECTRONIC DEVICE

(71) Applicant: LARGAN PRECISION CO., LTD., Taichung (TW)

(72) Inventors: Chun-Yen Chen, Taichung (TW); Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 270 days.

(21) Appl. No.: 15/246,655

(22) Filed: Aug. 25, 2016

(65) Prior Publication Data
US 2017/0363841 A1   Dec. 21, 2017

(30) Foreign Application Priority Data
Jun. 16, 2016   (TW) .............................. 105118934 A

(51) Int. Cl.
*G02B 13/00* (2006.01)
*G02B 9/62* (2006.01)

(52) U.S. Cl.
CPC ........... *G02B 13/0045* (2013.01); *G02B 9/62* (2013.01)

(58) Field of Classification Search
CPC .... G02B 13/0045; G02B 5/005; G02B 5/208; G02B 9/62; G02B 27/0025
USPC ....................................................... 359/713
See application file for complete search history.

(56) References Cited

U.S. PATENT DOCUMENTS

| | | | |
|---|---|---|---|
| 8,724,237 B2 | 5/2014 | Hsu et al. | |
| 9,046,672 B2 | 6/2015 | You | |
| 9,274,308 B2 | 3/2016 | Nabeta | |
| 9,274,315 B2 | 3/2016 | Lee | |
| 9,482,847 B1 | 11/2016 | Liu et al. | |
| 2015/0062405 A1 | 3/2015 | Chen et al. | |
| 2015/0062407 A1 | 3/2015 | Chen et al. | |
| 2015/0109684 A1 | 4/2015 | Son | |
| 2015/0338613 A1 | 11/2015 | Tang et al. | |
| 2015/0338614 A1 | 11/2015 | Tang et al. | |
| 2015/0362702 A1 | 12/2015 | Tang et al. | |
| 2016/0018629 A1 | 1/2016 | Tang et al. | |
| 2016/0097916 A1 | 4/2016 | Tang et al. | |
| 2016/0124184 A1 | 5/2016 | Tang et al. | |

(Continued)

FOREIGN PATENT DOCUMENTS

CN   105044880 A   11/2015
TW   201413320 A   4/2014

*Primary Examiner* — Wen Huang
(74) *Attorney, Agent, or Firm* — McClure, Qualey & Rodack, LLP

(57) ABSTRACT

An optical image lens assembly includes, in order from an object side to an image side, a first lens element, a second lens element, a third lens element, a fourth lens element, a fifth lens element and a sixth lens element. The first lens element with positive refractive power has an object-side surface being convex. The second lens element with positive refractive power has an image-side surface being convex. The fourth lens element has an image-side surface being concave. The fifth lens element with positive refractive power has an object-side surface being concave and an image-side surface being convex. The sixth lens element with negative refractive power has an image-side surface being concave in a paraxial region thereof and including at least one convex shape in an off-axial region thereof. The two surfaces of each of the fifth lens element and the sixth lens element are aspheric.

16 Claims, 19 Drawing Sheets

(56) References Cited

U.S. PATENT DOCUMENTS

| | | |
|---|---|---|
| 2016/0124186 A1 | 5/2016 | Tang et al. |
| 2016/0266354 A1 | 9/2016 | Jang |
| 2016/0341928 A1 | 11/2016 | Liu et al. |
| 2016/0341929 A1 | 11/2016 | Liu et al. |
| 2016/0341930 A1 | 11/2016 | Liu et al. |
| 2016/0341931 A1 | 11/2016 | Liu et al. |
| 2016/0341932 A1 | 11/2016 | Liu et al. |
| 2016/0341933 A1 | 11/2016 | Liu et al. |
| 2017/0227736 A1 | 8/2017 | Lai et al. |
| 2017/0227737 A1 | 8/2017 | Lai et al. |
| 2017/0227738 A1 | 8/2017 | Lai et al. |
| 2017/0227739 A1 | 8/2017 | Lai et al. |
| 2017/0235102 A1 | 8/2017 | Lai et al. |
| 2017/0235103 A1 | 8/2017 | Lai et al. |

OPTICAL IMAGE LENS ASSEMBLY, IMAGE CAPTURING DEVICE AND ELECTRONIC DEVICE

RELATED APPLICATIONS

This application claims priority to Taiwan Application Serial Number 105118934, filed Jun. 16, 2016, which is herein incorporated by reference.

BACKGROUND

Technical Field

The present disclosure relates to an optical image lens assembly and an image capturing device. More particularly, the present disclosure relates to an optical image lens assembly and an image capturing device with a compact size applicable to electronic devices.

Description of Related Art

In recent years, with the development of compact electronic devices based on popular demands, corresponding installed image capturing devices also advance toward trends of a large field of view, high image quality, miniaturization etc. However, conventional optical techniques cannot satisfy all trends at the same time. For examples, a lens assembly with a large field of view cannot be miniaturized due to the arrangement with spherical lens elements. A miniaturized lens assembly has insufficient aperture which would produce images with excessive noise in low light settings, lacking the depth of field effect, or unsatisfying results in popular applications due to insufficient field of view, etc. Hence, one of the goals in the optical lens industry is to find out how to achieve high image quality under the arrangement of large field of view, larger aperture and lens compactness at the same time.

SUMMARY

According to one aspect of the present disclosure, an optical image lens assembly includes, in order from an object side to an image side, a first lens element, a second lens element, a third lens element, a fourth lens element, a fifth lens element and a sixth lens element. The first lens element with positive refractive power has an object-side surface being convex in a paraxial region thereof. The second lens element with positive refractive power has an image-side surface being convex in a paraxial region thereof. The fourth lens element has an image-side surface being concave in a paraxial region thereof. The fifth lens element with positive refractive power has an object-side surface being concave in a paraxial region thereof and an image-side surface being convex in a paraxial region thereof, wherein the object-side surface and the image-side surface of the fifth lens element are aspheric. The sixth lens element with negative refractive power has an image-side surface being concave in a paraxial region thereof, wherein an object-side surface and the image-side surface of the sixth lens element are aspheric, and the image-side surface of the sixth lens element includes at least one convex shape in an off-axial region thereof. The optical image lens assembly has a total of six lens elements, and there is an air space between every two lens elements of the first lens element, the second lens element, the third lens element, the fourth lens element, the fifth lens element and the sixth lens element that are adjacent to each other. When a curvature radius of an object-side surface of the second lens element is R3, a curvature radius of the image-side surface of the second lens element is R4, a focal length of the second lens element is f2, a focal length of the third lens element is f3, and a focal length of the fourth lens element is f4, the following conditions are satisfied:

$0.53 \leq (R3+R4)/(R3-R4)$;

$|f2/f3|<3.0$; and $|f3/f4|<10$.

According to another aspect of the present disclosure, an image capturing device includes the optical image lens assembly of the aforementioned aspect and an image sensor, wherein the image sensor is disposed on an image surface of the optical image lens assembly.

According to yet another aspect of the present disclosure, an electronic device includes the image capturing device of the aforementioned aspect.

According to further another aspect of the present disclosure, an optical image lens assembly includes, in order from an object side to an image side, a first lens element, a second lens element, a third lens element, a fourth lens element, a fifth lens element and a sixth lens element. The first lens element with positive refractive power has an object-side surface being convex in a paraxial region thereof. The second lens element with positive refractive power has an image-side surface being convex in a paraxial region thereof. The third lens element with negative refractive power has an image-side surface being concave in a paraxial region thereof. The fifth lens element with positive refractive power has an object-side surface being concave in a paraxial region thereof and an image-side surface being convex in a paraxial region thereof, wherein the object-side surface and the image-side surface of the fifth lens element are aspheric. The sixth lens element with negative refractive power has an object-side surface being convex in a paraxial region thereof and an image-side surface being concave in a paraxial region thereof, wherein the object-side surface and the image-side surface of the sixth lens element are aspheric, and the image-side surface of the sixth lens element includes at least one convex shape in an off-axial region thereof. The optical image lens assembly has a total of six lens elements, and there is an air space between every two lens elements of the first lens element, the second lens element, the third lens element, the fourth lens element, the fifth lens element and the sixth lens element that are adjacent to each other. When a curvature radius of an object-side surface of the second lens element is R3, a curvature radius of the image-side surface of the second lens element is R4, a focal length of the second lens element is f2, and a focal length of the third lens element is f3, the following conditions are satisfied:

$0.53 \leq (R3+R4)/(R3-R4)$, and $|f2/f3|<3.0$.

DETAILED DESCRIPTION

Figure 1:
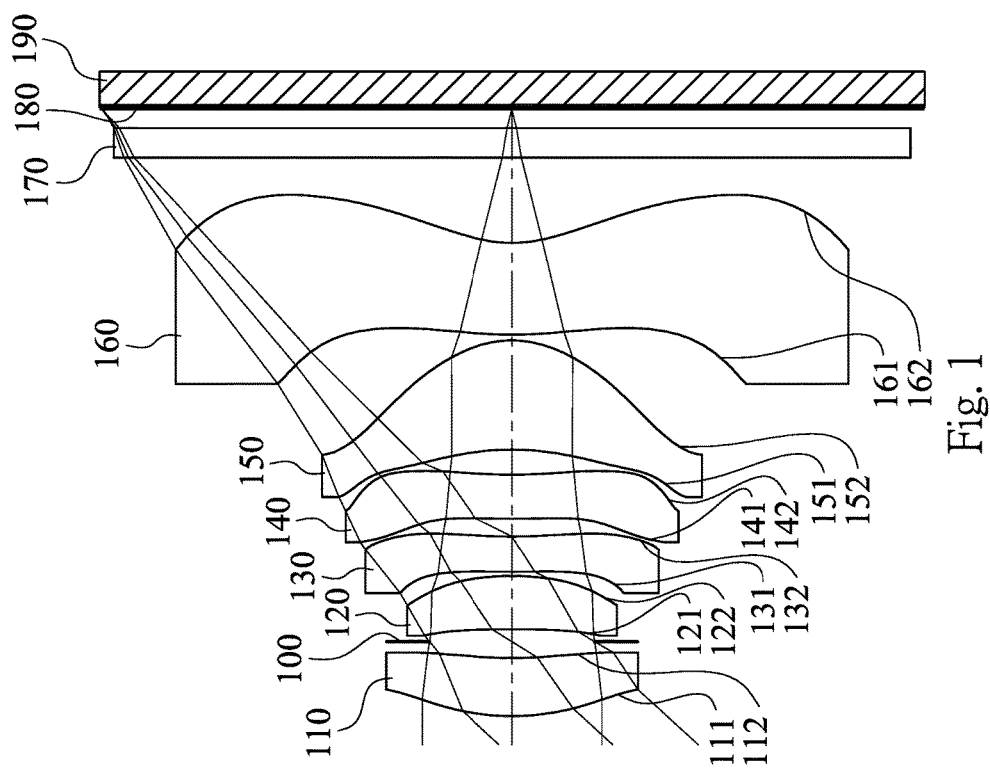
FIG. 1 is a schematic view of an image capturing device according to the 1st embodiment of the present disclosure.

An optical image lens assembly includes, in order from an object side to an image side, a first lens element, a second lens element, a third lens element, a fourth lens element, a fifth lens element and a sixth lens element. The optical image lens assembly has a total of six lens elements.

According to the optical image lens assembly of the present disclosure, there is an air space between every two lens elements of the first lens element, the second lens element, the third lens element, the fourth lens element, the fifth lens element and the sixth lens element that are adjacent to each other. That is, each of the first through sixth lens elements is a single and non-cemented lens element, and there is a space between every two adjacent lens elements. Moreover, the manufacturing process of the cemented lenses is more complex than the non-cemented lenses. In particular, a cementing surface of one lens element and a cementing surface of the following lens element need to have accurate curvature to ensure these two lens elements will be highly cemented. However, during the cementing process, those two lens elements might not be highly cemented due to displacements and it is thereby not favorable for image quality of the optical image lens assembly. Therefore, according to the optical image lens assembly of the present disclosure, having an air space in a paraxial region between every two adjacent lens elements avoids the problem generated by the cemented lens elements.

The first lens element with positive refractive power has an object-side surface being convex in a paraxial region thereof, and can have an image-side surface being concave in a paraxial region thereof. Therefore, the main light converging ability can be provided so as to reduce the volume of the optical image lens assembly and obtain an optimal compact size thereof.

The second lens element with positive refractive power has an image-side surface being convex in a paraxial region thereof. By such arrangement, the proper amount of positive refractive power of the first lens element can be provided, so that it is favorable for avoiding aberrations from excessive refraction of the off-axial light with a large aperture or low tolerance of the optical image lens assembly (against manufacturing errors, such as decentering, of the first lens element).

The third lens element can have negative refractive power, and can have an object-side surface being convex in a paraxial region thereof and an image-side surface being concave in a paraxial region thereof. Therefore, it is favorable for correcting aberrations generated from the first lens element and the second lens element. Furthermore, the image-side surface of the third lens element can include at least one convex shape in an off-axial region thereof. Therefore, it is favorable for enhancing the image quality by correcting aberrations of the off-axial region on the image.

The fourth lens element can have an image-side surface being concave in a paraxial region thereof, so that astigmatism of the optical image lens assembly can be corrected. Furthermore, the image-side surface of the fourth lens element can include at least one convex shape in an off-axial region thereof. Thus, it is favorable for enhancing the image quality by correcting aberrations of the off-axial region on the image.

The fifth lens element with positive refractive power has an object-side surface being concave in a paraxial region thereof and an image-side surface being convex in a paraxial region thereof. Therefore, astigmatism of the optical image lens assembly can be corrected by the meniscus lens arrangement while reducing the sensitivity thereof.

The sixth lens element with negative refractive power can have an object-side surface being convex in a paraxial region thereof, and has an image-side surface being concave in a paraxial region thereof. Therefore, the principal point can be positioned closer to the object side, so that the back focal length can be reduced for lens miniaturization with effective space utilization of the optical image lens assembly adopted in the camera module. Also, the image-side surface of the sixth lens element includes at least one convex shape in an off-axial region thereof, so that off-axial aberrations can be corrected.

When a curvature radius of the object-side surface of the second lens element is R3, and a curvature radius of the image-side surface of the second lens element is R4, the following condition is satisfied: $0.53 \leq (R3+R4)/(R3-R4)$. Therefore, it is favorable for positioning the principal point of the second lens element closer to the image surface for enlarging the field of view of the optical image lens assembly and correcting aberrations. Preferably, the following condition can be satisfied: $0.80 < (R3+R4)/(R3-R4) < 4.0$. More preferably, the following condition can be satisfied: $0.90 < (R3+R4)/(R3-R4) < 3.50$.

When a focal length of the second lens element is f2, and a focal length of the third lens element is f3, the following condition is satisfied: $|f2/f3| < 3.0$. Therefore, the positive refractive power of the second lens element will be sufficient so as to provide the functionality with the corresponding first lens element with positive refractive power. More preferably, the following condition can be satisfied: $0<|f2/f3|<1.50$.

When the focal length of the third lens element is f3, and a focal length of the fourth lens element is f4, the following condition is satisfied: $|f3/f4|<10$. Therefore, it is favorable for correcting aberrations and enhancing the image quality. More preferably, the following condition can be satisfied: $|f3/f4|<2.0$.

When a curvature radius of the object-side surface of the first lens element is R1, and a curvature radius of the image-side surface of the first lens element is R2, the following condition is satisfied: $(R1+R2)/(R1-R2)<-1.60$. Therefore, it is favorable for avoiding the excessive positive refractive power of the first lens element so as to provide features and effects thereof with the corresponding second lens element.

When an axial distance between the object-side surface of the first lens element and the image-side surface of the sixth lens element is Td, and a sum of axial distances between every two of the lens elements of the optical image lens assembly that are adjacent to each other is $\Sigma AT$, the following condition is satisfied: $4.0<Td/\Sigma AT<20$. Therefore, it is favorable for utilizing the space of the optical image lens assembly by closely arranging the lens elements thereof.

When a focal length of the first lens element is f1, and the focal length of the second lens element is f2, the following condition is satisfied: $0.50<f1/f2<2.0$. Therefore, it is favorable for providing the functionality of both the first lens element and the second lens element having positive refractive power for reducing the sensitivity. More preferably, the following condition can be satisfied: $0.50<f1/f2<1.50$.

When a curvature radius of the object-side surface of the fifth lens element is R9, and a curvature radius of the image-side surface of the fifth lens element is R10, and the following condition is satisfied: $0<(R9-R10)/(R9+R10)<0.75$. Therefore, it is favorable for correcting aberrations and astigmatism by the meniscus shape configuration of the fifth lens element.

When the focal length of the first lens element is f1, the focal length of the second lens element is f2, the focal length of the third lens element is f3, the focal length of the fourth lens element is f4, a focal length of the fifth lens element is f5, and a focal length of the sixth lens element is f6, the following conditions are satisfied: $|f1|<|f4|$, $|f2|<|f4|$, $|f3|<|f4|$, $|f5|<|f4|$, and $|f6|<|f4|$. Therefore, high order aberrations can be corrected by arranging the fourth lens element with weaker refractive power in the optical image lens assembly (that is, the fourth lens element has the weakest refractive power among the lens elements), so that the better image quality can be obtained.

When a central thickness of the second lens element is CT2, and an axial distance between the first lens element and the second lens element is T12, the following condition is satisfied: $0<CT2/T12<5.0$. Therefore, the interference between the lens elements can be avoided in lens assembling by having sufficient space between the first lens element and the second lens element, and it is also favorable for arranging other elements, such as a light blocking sheet, between the first lens element and the second lens element.

When an Abbe number of the second lens element is V2, and an Abbe number of the third lens element is V3, the following condition is satisfied: $0.20<V3/V2<0.60$. Therefore, it is favorable for balancing corrections of chromatic aberration and astigmatism.

When a focal length of the optical image lens assembly is f, a curvature radius of the object-side surface of the first lens element is R1, and a curvature radius of the image-side surface of the first lens element is R2, the following to condition is satisfied: $1.0<f/R1+f/|R2|<5.0$. Therefore, it is favorable for avoiding the surfaces of the first lens element being overly flat with oversized effective radii thereof and difficult for miniaturization.

When the focal length of the optical image lens assembly is f, and a curvature radius of the image-side surface of the fourth lens element is R8, the following condition is satisfied: $0<R8/f<2.5$. Therefore, it is favorable for avoiding overly curved image-side surface of the fourth lens element and stray light generated from unwanted surface reflections due to excessive curvature.

When a maximum image height of the optical image lens assembly is ImgH, and the focal length of the optical image lens assembly is f, the following condition is satisfied: $0.85<ImgH/f<2.0$. Therefore, it is favorable for providing the optical image lens assembly with a large field of view.

When the Abbe number of the third lens element is V3, an Abbe number of the fifth lens element is V5, and an Abbe number of the sixth lens element is V6, the following condition is satisfied: $0.50<(V3+V6)/V5<1.20$. Therefore, it is favorable for balancing corrections of chromatic aberration and astigmatism.

According to the optical image lens assembly of the present disclosure, the lens elements thereof can be made of glass or plastic materials. When the lens elements are made of glass materials, the distribution of the refractive power of the optical image lens assembly may be more flexible to design. When the lens elements are made of plastic materials, manufacturing costs can be effectively reduced. Furthermore, surfaces of each lens element can be arranged to be aspheric, since the aspheric surface of the lens element is easy to form a shape other than a spherical surface so as to have more controllable variables for eliminating aberrations thereof, and to further decrease the required amount of lens elements in the optical image lens assembly. Therefore, the total track length of the optical image lens assembly can also be reduced.

According to the optical image lens assembly of the present disclosure, each of an object-side surface and an image-side surface has a paraxial region and an off-axial region. The paraxial region refers to the region of the surface where light rays travel close to an optical axis, and the off-axial region refers to the region of the surface away from the paraxial region. Particularly, when the lens element has a convex surface, it indicates that the surface can be convex in the paraxial region thereof; when the lens element has a concave surface, it indicates that the surface can be concave in the paraxial region thereof.

According to the optical image lens assembly of the present disclosure, the refractive power or the focal length of a lens element being positive or negative may refer to the refractive power or the focal length in a paraxial region of the lens element.

According to the optical image lens assembly of the present disclosure, the optical image lens assembly can include at least one stop, such as an aperture stop, a glare stop or a field stop. Said glare stop or said field stop is for eliminating the stray light and thereby improving the image resolution thereof.

According to the optical image lens assembly of the present disclosure, the image surface of the optical image lens assembly, based on the corresponding image sensor, can be flat or curved. In particular, the image surface can be a curved surface being concave facing towards the object side.

According to the optical image lens assembly of the present disclosure, an aperture stop can be configured as a front stop or a middle stop. A front stop disposed between an object and the first lens element can provide a longer distance between an exit pupil of the optical image lens assembly and the image surface, and thereby obtains a telecentric effect and improves the image-sensing efficiency of the image sensor, such as CCD or CMOS. A middle stop disposed between the first lens element and the image surface is favorable for enlarging the field of view of the optical image lens assembly and thereby provides a wider field of view for the same.

According to the optical image lens assembly of the present disclosure, the optical image lens assembly can be applied to 3D (three-dimensional) image capturing applications, in products such as digital cameras, mobile devices, digital tablets, smart TVs, surveillance systems, motion sensing input devices, driving recording systems, rearview camera systems, and wearable devices.

According to the present disclosure, an image capturing device is provided. The image capturing device includes the aforementioned optical image lens assembly and an image sensor, wherein the image sensor is disposed on the image side of the aforementioned optical image lens assembly, that is, the image sensor can be disposed on or near the image surface of the aforementioned optical image lens assembly. By the arrangement of positive refractive power of both of the first lens element and the second lens element which are closest to the imaged object, the excessive positive refractive power of the first lens element can be avoided, so that it is favorable for avoiding excessive aberrations or over sensitivity of the tolerance (such as the eccentricity) of the first lens element which are generated by the over refraction of the off-axial light under large aperture. Thus, the excessive positive refractive power of the first lens element generated from the conventional arrangement of the first lens element with positive refractive power and the second lens element with negative refractive power can be improved. Preferably, the image capturing device can further include a barrel member, a holder member or a combination thereof.

According to the present disclosure, an electronic device is provided, which includes the aforementioned image capturing device. Therefore, image quality of the electronic device can be improved. Preferably, the electronic device can further include but not limited to a control unit, a display, a storage unit, a random access memory unit (RAM) or a combination thereof.

According to the above description of the present disclosure, the following 1st-11th specific embodiments are provided for further explanation.

1st Embodiment

Figure 2:
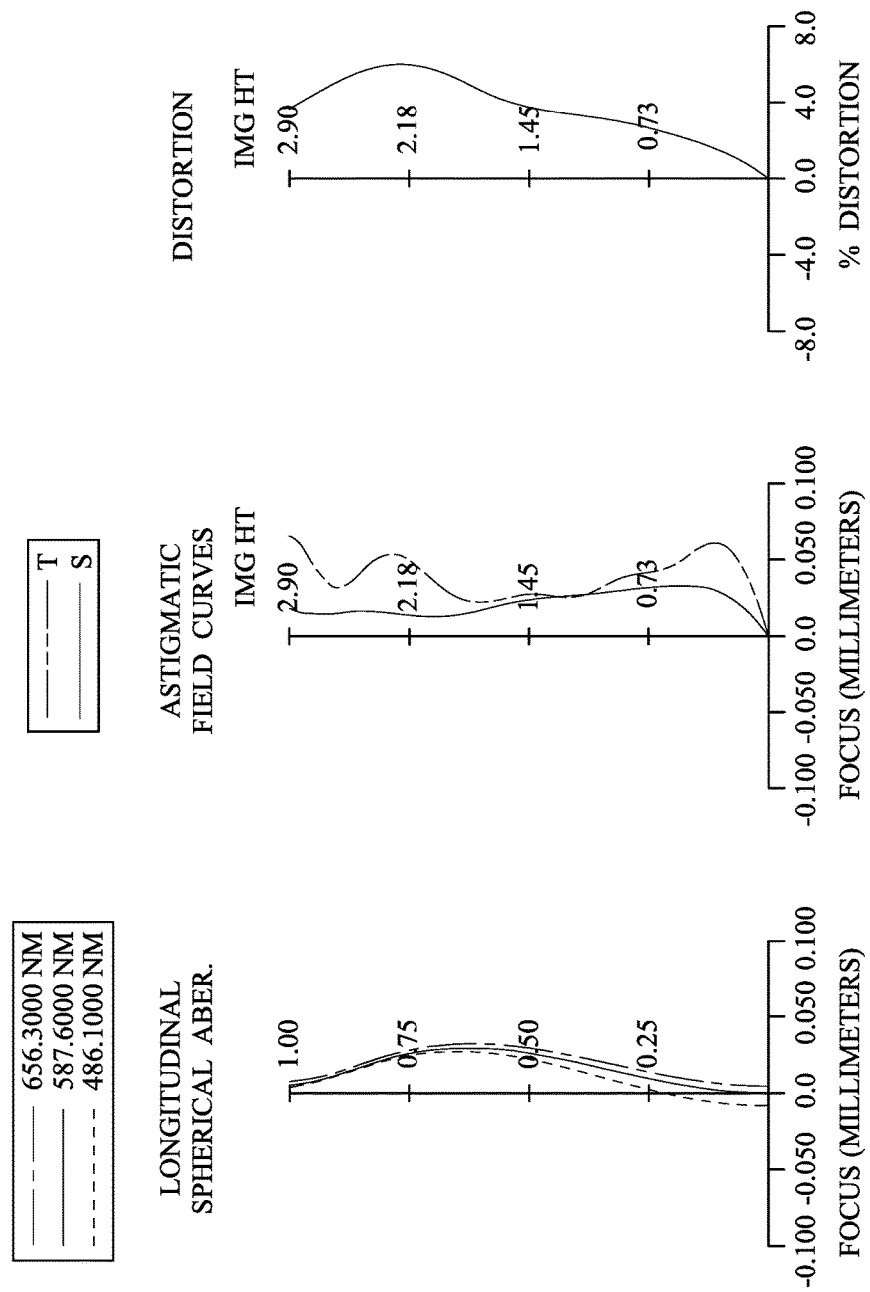
FIG. 2 shows spherical aberration curves, astigmatic field curves and a distortion curve of the image capturing device according to the 1st embodiment.

FIG. 1 is a schematic view of an image capturing device according to the 1st embodiment of the present disclosure. FIG. 2 shows spherical aberration curves, astigmatic field curves and a distortion curve of the image capturing device according to the 1st embodiment. In FIG. 1, the image capturing device includes an optical image lens assembly (its reference numeral is omitted) and an image sensor 190. The optical image lens assembly includes, in order from an object side to an image side, a first lens element 110, an aperture stop 100, a second lens element 120, a third lens element 130, a fourth lens element 140, a fifth lens element 150, a sixth lens element 160, an IR-cut filter 170 and an image surface 180, wherein the image sensor 190 is disposed on the image surface 180 of the optical image lens assembly. The optical image lens assembly has a total of six lens elements (110-160), and there is an air space between every two lens elements of the first lens element 110, the second lens element 120, the third lens element 130, the fourth lens element 140, the fifth lens element 150 and the sixth lens element 160 that are adjacent to each other.

The first lens element 110 with positive refractive power has an object-side surface 111 being convex in a paraxial region thereof and an image-side surface 112 being concave in a paraxial region thereof. The first lens element 110 is made of a plastic material, and has the object-side surface 111 and the image-side surface 112 being both aspheric.

The second lens element 120 with positive refractive power has an object-side surface 121 being concave in a paraxial region thereof and an image-side surface 122 being convex in a paraxial region thereof. The second lens element 120 is made of a plastic material, and has the object-side surface 121 and the image-side surface 122 being both aspheric.

The third lens element 130 with negative refractive power has an object-side surface 131 being convex in a paraxial region thereof and an image-side surface 132 being concave in a paraxial region thereof. The third lens element 130 is made of a plastic material, and has the object-side surface 131 and the image-side surface 132 being both aspheric. Furthermore, the image-side surface 132 of the third lens element 130 includes at least one convex shape in an off-axial region thereof.

The fourth lens element 140 with negative refractive power has an object-side surface 141 being convex in a paraxial region thereof and an image-side surface 142 being concave in a paraxial region thereof. The fourth lens element 140 is made of a plastic material, and has the object-side surface 141 and the image-side surface 142 being both aspheric. Furthermore, the image-side surface 142 of the fourth lens element 140 includes at least one convex shape in an off-axial region thereof.

The fifth lens element 150 with positive refractive power has an object-side surface 151 being concave in a paraxial region thereof and an image-side surface 152 being convex in a paraxial region thereof. The fifth lens element 150 is made of a plastic material, and has the object-side surface 151 and the image-side surface 152 being both aspheric.

The sixth lens element 160 with negative refractive power has an object-side surface 161 being convex in a paraxial region thereof and an image-side surface 162 being concave in a paraxial region thereof. The sixth lens element 160 is made of a plastic material, and has the object-side surface 161 and the image-side surface 162 being both aspheric. Furthermore, the image-side surface 162 of the sixth lens element 160 includes at least one convex shape in an off-axial region thereof.

The IR-cut filter 170 is made of a glass material and located between the sixth lens element 160 and the image surface 180, and will not affect the focal length of the optical image lens assembly.

The equation of the aspheric surface profiles of the aforementioned lens elements of the 1st embodiment is expressed as follows:

$$X(Y) = (Y^2/R)/(1 - sqrt(1 - (1+k) \times (Y/R)^2)) + \sum_i (Ai) \times (Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the optical image lens assembly according to the 1st embodiment, when a focal length of the optical image lens assembly is f, an f-number of the optical image lens assembly is Fno, and half of a maximum field of view of the optical image lens assembly is HFOV, these parameters have the following values: f=2.55 mm; Fno=2.01; and HFOV=47.5 degrees.

In the optical image lens assembly according to the 1st embodiment, when an Abbe number of the second lens element 120 is V2, an Abbe number of the third lens element 130 is V3, an Abbe number of the fifth lens element 150 is V5, and an Abbe number of the sixth lens element 160 is V6, the following conditions are satisfied: V3/V2=0.36; and (V3+V6)/V5=0.79.

In the optical image lens assembly according to the 1st embodiment, when a central thickness of the second lens element 120 is CT2, and an axial distance between the first lens element 110 and the second lens element 120 is T12, the following condition is satisfied: CT2/T12=1.87.

In the optical image lens assembly according to the 1st embodiment, when an axial distance between the object-side surface 111 of the first lens element 110 and the image-side surface 162 of the sixth lens element 160 is Td, the axial distance between the first lens element 110 and the second lens element 120 is T12, an axial distance between the second lens element 120 and the third lens element 130 is T23, an axial distance between the third lens element 130 and the fourth lens element 140 is T34, an axial distance between the fourth lens element 140 and the fifth lens element 150 is T45, an axial distance between the fifth lens element 150 and the sixth lens element 160 is T56, and a sum of axial distances between every two of the lens elements of the optical image lens assembly that are adjacent to each other is ΣAT (that is, ΣAT=T12+T23+T34+T45+T56), the following condition is satisfied: Td/ΣAT=5.84.

In the optical image lens assembly according to the 1st embodiment, when a maximum image height of the optical image lens assembly is ImgH (half of a diagonal length of an effective photosensitive area of the image sensor 190), and the focal length of the optical image lens assembly is f, the following condition is satisfied: ImgH/f=1.14.

In the optical image lens assembly according to the 1st embodiment, when a curvature radius of the object-side surface 111 of the first lens element 110 is R1, and a curvature radius of the image-side surface 112 of the first lens element 110 is R2, the following condition is satisfied: (R1+R2)/(R1−R2)=−2.88.

In the optical image lens assembly according to the 1st embodiment, when a curvature radius of the object-side surface 121 of the second lens element 120 is R3, and a curvature radius of the image-side surface 122 of the second lens element 120 is R4, the following condition is satisfied: (R3+R4)/(R3−R4)=1.51.

In the optical image lens assembly according to the 1st embodiment, when a curvature radius of the object-side surface 151 of the fifth lens element 150 is R9, and a curvature radius of the image-side surface 152 of the fifth lens element 150 is R10, the following condition is satisfied: (R9−R10)/(R9+R10)=0.47.

In the optical image lens assembly according to the 1st embodiment, when the focal length of the optical image lens assembly is f, the curvature radius of the object-side surface 111 of the first lens element 110 is R1, and the curvature radius of the image-side surface 112 of the first lens element 110 is R2, the following condition is satisfied: f/R1+f/|R2|=2.22.

In the optical image lens assembly according to the 1st embodiment, when a focal length of the second lens element 120 is f2, and a focal length of the third lens element 130 is f3, the following condition is satisfied: |f2/f3|=0.52.

In the optical image lens assembly according to the 1st embodiment, when the focal length of the third lens element 130 is f3, and a focal length of the fourth lens element 140 is f4, the following condition is satisfied: |f3/f4|=0.77.

In the optical image lens assembly according to the 1st embodiment, when a focal length of the first lens element 110 is f1, and the focal length of the second lens element 120 is f2, the following condition is satisfied: f1/f2=1.14.

The detailed optical data of the 1st embodiment are shown in Table 1 and the aspheric surface data are shown in Table 2 below.

TABLE 1

1st Embodiment
f = 2.55 mm, Fno = 2.01, HFOV = 47.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.706 | ASP | 0.410 | Plastic | 1.544 | 55.9 | 5.63 |
| 2 | | 3.524 | ASP | 0.115 | | | | |
| 3 | Ape. Stop | Plano | | 0.086 | | | | |
| 4 | Lens 2 | −10.627 | ASP | 0.375 | Plastic | 1.544 | 55.9 | 4.93 |
| 5 | | −2.167 | ASP | 0.030 | | | | |
| 6 | Lens 3 | 10.245 | ASP | 0.253 | Plastic | 1.660 | 20.4 | −9.55 |
| 7 | | 3.863 | ASP | 0.124 | | | | |
| 8 | Lens 4 | 5.209 | ASP | 0.310 | Plastic | 1.544 | 55.9 | −12.36 |
| 9 | | 2.872 | ASP | 0.177 | | | | |
| 10 | Lens 5 | −2.083 | ASP | 0.769 | Plastic | 1.544 | 55.9 | 1.79 |
| 11 | | −0.750 | ASP | 0.040 | | | | |
| 12 | Lens 6 | 2.671 | ASP | 0.650 | Plastic | 1.639 | 23.5 | −2.46 |
| 13 | | 0.895 | ASP | 0.600 | | | | |

TABLE 1-continued

1st Embodiment
f = 2.55 mm, Fno = 2.01, HFOV = 47.5 deg.

| Surface # | | Curvature Radius | Thickness | Material | Index | Abbe # | Focal Length |
|---|---|---|---|---|---|---|---|
| 14 | IR-cut filter | Plano | 0.210 | Glass | 1.517 | 64.2 | — |
| 15 | | Plano | 0.146 | | | | |
| 16 | Image | Plano | — | | | | |

Reference wavelength is 587.6 nm (d-line).

TABLE 2

| Aspheric Coefficients | | | | | | |
|---|---|---|---|---|---|---|
| Surface # | 1 | 2 | 4 | 5 | 6 | 7 |
| k = | −2.1503E−01 | −4.1194E+01 | 2.8630E+01 | −3.0290E+00 | −8.0646E+01 | −4.2570E+01 |
| A4 = | 1.1821E−02 | 5.2079E−02 | −1.0225E−01 | −4.3988E−01 | −3.9665E−01 | −7.9880E−02 |
| A6 = | −2.0540E−01 | −1.9113E−01 | −1.2111E−01 | 5.5237E−01 | 3.5070E−01 | −3.2864E−01 |
| A8 = | 5.7854E−01 | −5.2187E−01 | −6.3395E−01 | −8.0659E−01 | −1.0721E+00 | 8.9033E−01 |
| A10 = | −1.1254E+00 | 8.2953E−01 | 1.1538E+00 | −4.1537E−01 | 1.2561E+00 | −1.7592E+00 |
| A12 = | 6.4609E−01 | | | 1.7554E+00 | −1.1404E+00 | 1.8516E+00 |
| A14 = | | | | | | −7.3046E−01 |
| Surface # | 8 | 9 | 10 | 11 | 12 | 13 |
| k = | −2.7750E+01 | −5.2152E+01 | −2.5511E−01 | −1.3586E+00 | −8.9787E+01 | −5.3378E+00 |
| A4 = | −5.2751E−01 | −2.2104E−01 | −1.6243E−01 | −6.4929E−02 | 5.5725E−02 | −5.8715E−02 |
| A6 = | 8.5435E−01 | 5.8019E−01 | 9.8539E−01 | 3.2264E−01 | −2.3245E−01 | −2.7284E−03 |
| A8 = | −3.1330E+00 | −1.7138E+00 | −2.3748E+00 | −9.7532E−01 | 2.0188E−01 | 1.3158E−02 |
| A10 = | 5.7928E+00 | 2.7937E+00 | 4.1280E+00 | 1.2893E+00 | −7.9720E−02 | −5.8094E−03 |
| A12 = | −4.4041E+00 | −2.2632E+00 | −4.2626E+00 | −8.0370E−01 | 8.4974E−03 | 1.1667E−03 |
| A14 = | 1.1877E+00 | 6.7015E−01 | 2.1576E+00 | 2.4447E−01 | 2.1875E−03 | −1.1754E−04 |
| A16 = | | | −4.1133E−01 | −2.9550E−02 | −4.2083E−04 | 4.8616E−06 |

In Table 1, the curvature radius, the thickness and the focal length are shown in millimeters (mm). Surface numbers 0-16 represent the surfaces sequentially arranged from the object side to the image side along the optical axis. In Table 2, k represents the conic coefficient of the equation of the aspheric surface profiles. A4-A16 represent the aspheric coefficients ranging from the 4th order to the 16th order. The tables presented below for each embodiment correspond to schematic parameter and aberration curves of each embodiment, and term definitions of the tables are the same as those in Table 1 and Table 2 of the 1st embodiment. Therefore, an explanation in this regard will not be provided again.

Furthermore, according to the 1st embodiment, when the focal length of the first lens element 110 is f1, the focal length of the second lens element 120 is f2, the focal length of the third lens element 130 is f3, the focal length of the fourth lens element 140 is f4, a focal length of the fifth lens element 150 is f5, and a focal length of the sixth lens element 160 is f6, the following conditions are satisfied: |f1|<|f4|; |f2|<|f4|; |f3|<|f4|; |f5|<|f4|; and |f6|<|f4|.

2nd Embodiment

Figure 3:
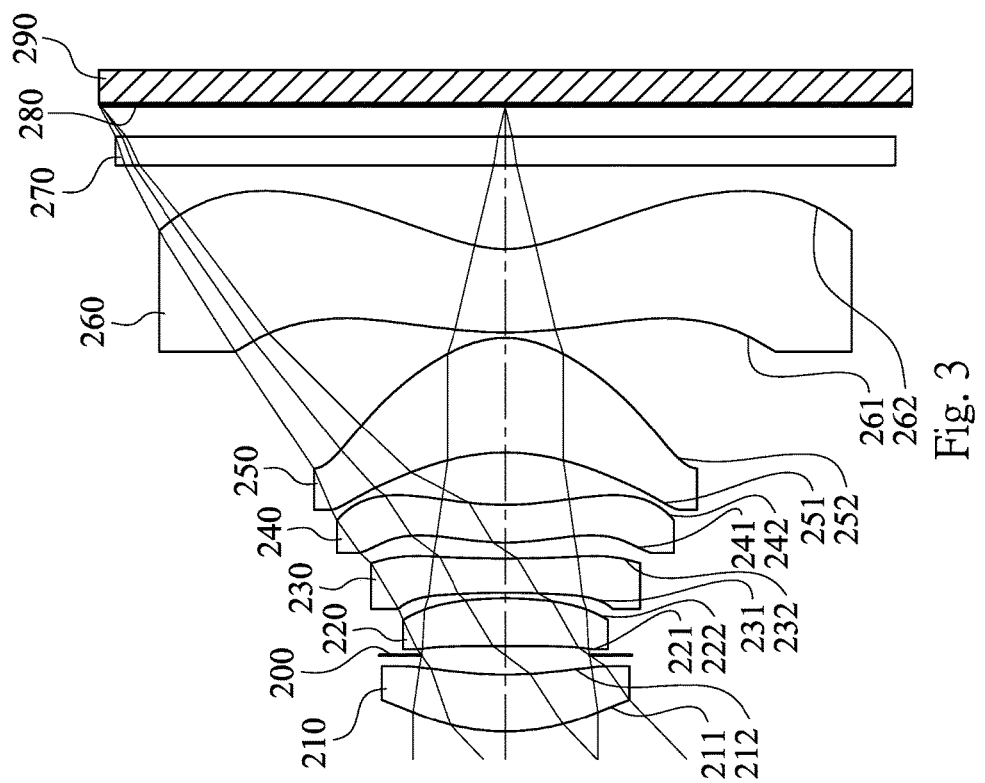
FIG. 3 is a schematic view of an image capturing device according to the 2nd embodiment of the present disclosure.
Figure 4:
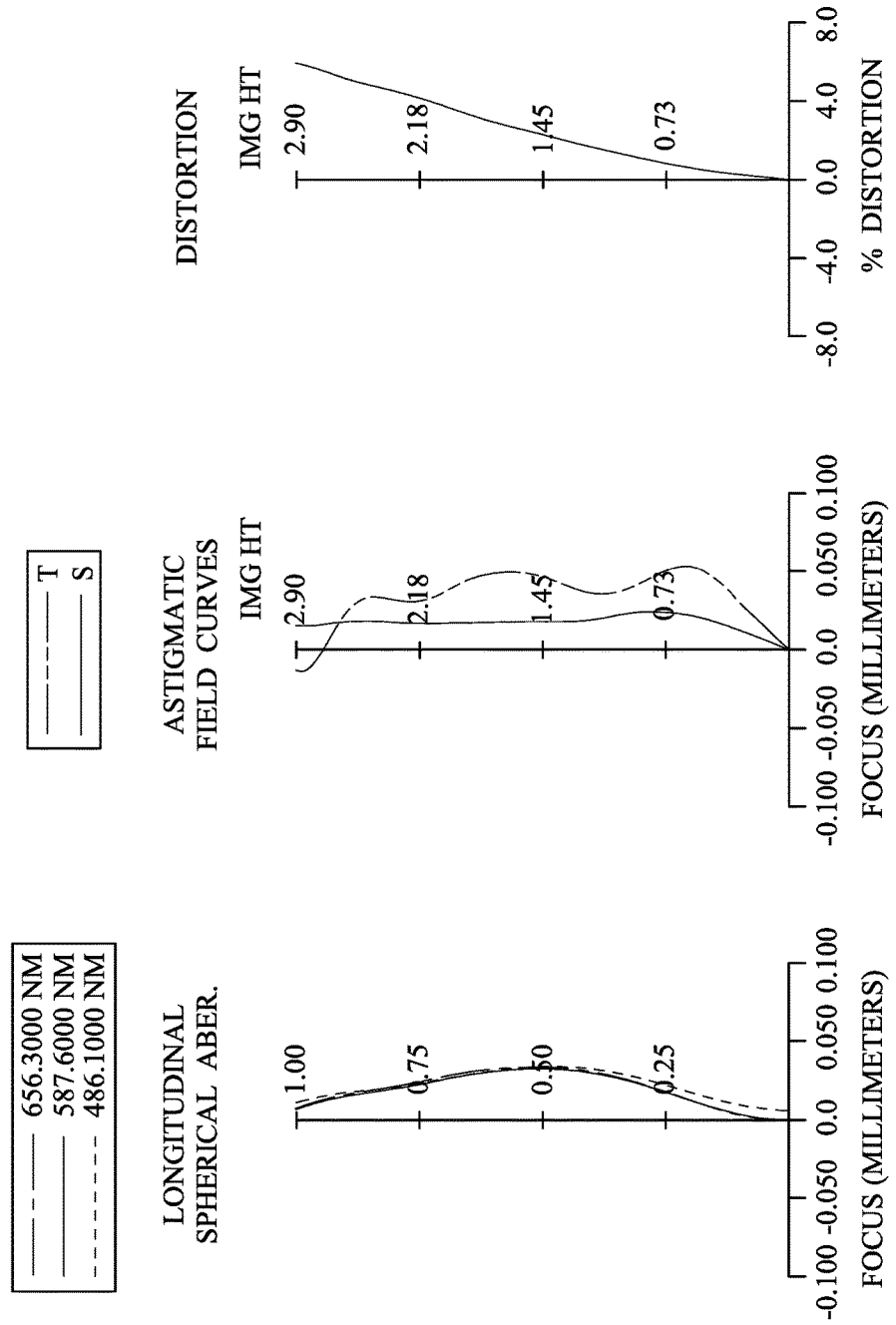
FIG. 4 shows spherical aberration curves, astigmatic field curves and a distortion curve of the image capturing device according to the 2nd embodiment.

FIG. 3 is a schematic view of an image capturing device according to the 2nd embodiment of the present disclosure. FIG. 4 shows spherical aberration curves, astigmatic field curves and a distortion curve of the image capturing device according to the 2nd embodiment. In FIG. 3, the image capturing device includes an optical image lens assembly (its reference numeral is omitted) and an image sensor 290. The optical image lens assembly includes, in order from an object side to an image side, a first lens element 210, an aperture stop 200, a second lens element 220, a third lens element 230, a fourth lens element 240, a fifth lens element 250, a sixth lens element 260, an IR-cut filter 270 and an image surface 280, wherein the image sensor 290 is disposed on the image surface 280 of the optical image lens assembly. The optical image lens assembly has a total of six lens elements (210-260), and there is an air space between every two lens elements of the first lens element 210, the second lens element 220, the third lens element 230, the fourth lens element 240, the fifth lens element 250 and the sixth lens element 260 that are adjacent to each other.

The first lens element 210 with positive refractive power has an object-side surface 211 being convex in a paraxial region thereof and an image-side surface 212 being concave in a paraxial region thereof. The first lens element 210 is made of a plastic material, and has the object-side surface 211 and the image-side surface 212 being both aspheric.

The second lens element 220 with positive refractive power has an object-side surface 221 being convex in a paraxial region thereof and an image-side surface 222 being convex in a paraxial region thereof. The second lens element 220 is made of a plastic material, and has the object-side surface 221 and the image-side surface 222 being both aspheric.

The third lens element 230 with negative refractive power has an object-side surface 231 being concave in a paraxial region thereof and an image-side surface 232 being concave in a paraxial region thereof. The third lens element 230 is made of a plastic material, and has the object-side surface 231 and the image-side surface 232 being both aspheric.

Furthermore, the image-side surface 232 of the third lens element 230 includes at least one convex shape in an off-axial region thereof.

The fourth lens element 240 with positive refractive power has an object-side surface 241 being convex in a paraxial region thereof and an image-side surface 242 being concave in a paraxial region thereof. The fourth lens element 240 is made of a plastic material, and has the object-side surface 241 and the image-side surface 242 being both aspheric. Furthermore, the image-side surface 242 of the fourth lens element 240 includes at least one convex shape in an off-axial region thereof.

The fifth lens element 250 with positive refractive power has an object-side surface 251 being concave in a paraxial region thereof and an image-side surface 252 being convex in a paraxial region thereof. The fifth lens element 250 is made of a plastic material, and has the object-side surface 251 and the image-side surface 252 being both aspheric.

The sixth lens element 260 with negative refractive power has an object-side surface 261 being convex in a paraxial region thereof and an image-side surface 262 being concave in a paraxial region thereof. The sixth lens element 260 is made of a plastic material, and has the object-side surface 261 and the image-side surface 262 being both aspheric. Furthermore, the image-side surface 262 of the sixth lens element 260 includes at least one convex shape in an off-axial region thereof.

The IR-cut filter 270 is made of a glass material and located between the sixth lens element 260 and the image surface 280, and will not affect the focal length of the optical image lens assembly.

The detailed optical data of the 2nd embodiment are shown in Table 3 and the aspheric surface data are shown in Table 4 below.

TABLE 3

2nd Embodiment
f = 2.85 mm, Fno = 2.15, HFOV = 43.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.587 | ASP | 0.410 | Plastic | 1.544 | 55.9 | 5.88 |
| 2 | | 2.866 | ASP | 0.139 | | | | |
| 3 | Ape. Stop | Plano | | 0.066 | | | | |
| 4 | Lens 2 | 100.000 | ASP | 0.341 | Plastic | 1.544 | 55.9 | 4.89 |
| 5 | | −2.729 | ASP | 0.039 | | | | |
| 6 | Lens 3 | −6.539 | ASP | 0.245 | Plastic | 1.660 | 20.4 | −4.84 |
| 7 | | 6.334 | ASP | 0.115 | | | | |
| 8 | Lens 4 | 1.646 | ASP | 0.270 | Plastic | 1.544 | 55.9 | 12.00 |
| 9 | | 2.075 | ASP | 0.374 | | | | |
| 10 | Lens 5 | −1.593 | ASP | 0.825 | Plastic | 1.544 | 55.9 | 1.73 |
| 11 | | −0.699 | ASP | 0.040 | | | | |
| 12 | Lens 6 | 2.986 | ASP | 0.596 | Plastic | 1.639 | 23.5 | −2.00 |
| 13 | | 0.825 | ASP | 0.600 | | | | |
| 14 | IR-cut filter | Plano | | 0.210 | Glass | 1.517 | 64.2 | — |
| 15 | | Plano | | 0.226 | | | | |
| 16 | Image | Plano | | — | | | | |

Reference wavelength is 587.6 nm (d-line).

TABLE 4

Aspheric Coefficients

| Surface # | 1 | 2 | 4 | 5 | 6 | 7 |
|---|---|---|---|---|---|---|
| k = | −6.0216E−03 | −4.1194E+01 | 2.8630E+01 | −3.0290E+00 | −8.0646E+01 | −4.2570E+01 |
| A4 = | −6.0877E−03 | 1.4026E−01 | −1.4643E−01 | 4.0501E−02 | 1.4281E−01 | −1.7363E−01 |
| A6 = | −7.8322E−02 | −3.7638E−01 | −2.3012E−02 | −1.2263E+00 | −7.6316E−01 | 8.6569E−01 |
| A8 = | 1.8561E−01 | 1.3267E−02 | −3.2438E−01 | 2.6001E+00 | 7.1938E−02 | −2.7291E+00 |
| A10 = | −4.3665E−01 | 3.2456E−01 | 7.1020E−01 | −2.7647E+00 | 1.7924E+00 | 4.2459E+00 |
| A12 = | 2.5036E−01 | | | 1.1124E+00 | −2.5682E+00 | −3.6142E+00 |
| A14 = | | | | | | 1.3085E+00 |

| Surface # | 8 | 9 | 10 | 11 | 12 | 13 |
|---|---|---|---|---|---|---|
| k = | −2.7750E+01 | −2.5016E+01 | −5.9725E−01 | −1.3625E+00 | −8.9787E+01 | −6.5882E+00 |
| A4 = | 2.3826E−02 | 5.7401E−02 | −7.4731E−02 | 1.9348E−01 | 1.1273E−01 | −1.7134E−03 |
| A6 = | −9.2614E−01 | −4.3257E−01 | 6.2860E−01 | −2.8364E−01 | −1.6219E−01 | −2.2336E−02 |
| A8 = | 2.2116E+00 | 6.1584E−01 | −1.7354E+00 | 1.1670E−01 | 8.6218E−02 | 1.0000E−02 |
| A10 = | −3.2957E+00 | −5.2471E−01 | 2.7403E+00 | 5.0526E−02 | −2.2661E−02 | −2.0385E−03 |
| A12 = | 2.4462E+00 | 2.2381E−01 | −2.3844E+00 | −1.0386E−01 | 2.1360E−03 | 1.7170E−04 |
| A14 = | −6.5940E−01 | −3.8801E−02 | 1.0478E+00 | 6.2737E−02 | 1.6677E−04 | −9.4418E−07 |
| A16 = | | | −1.8032E−01 | −1.2502E−02 | −3.2486E−05 | −4.2277E−07 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 2.85 | (R1 + R2)/(R1 − R2) | −3.48 |
| Fno | 2.15 | (R3 + R4)/(R3 − R4) | 0.95 |
| HFOV [deg.] | 43.7 | (R9 − R10)/(R9 + R10) | 0.39 |
| V3/V2 | 0.36 | f/R1 + f/|R2| | 2.79 |
| (V3 + V6)/V5 | 0.79 | |f2/f3| | 1.01 |
| CT2/T12 | 1.66 | |f3/f4| | 0.40 |
| Td/ΣAT | 4.48 | f1/f2 | 1.20 |
| ImgH/f | 1.02 | | |

Furthermore, according to the 2nd embodiment, when the focal length of the first lens element 210 is f1, the focal length of the second lens element 220 is f2, the focal length of the third lens element 230 is f3, the focal length of the fourth lens element 240 is f4, a focal length of the fifth lens element 250 is f5, and a focal length of the sixth lens element 260 is f6, the following conditions are satisfied: |f1|<|f4|; |f2|<|f4|; |f3|<|f4|; |f5|<|f4|; and |f6|<|f4|.

3rd Embodiment

Figure 5:
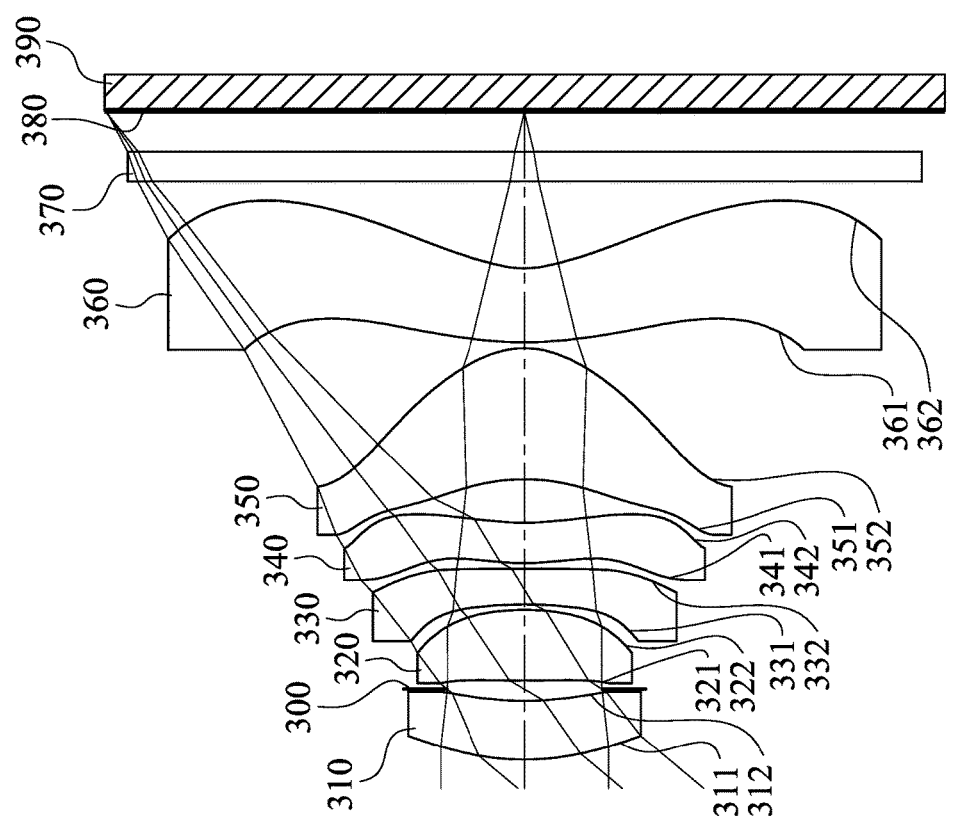
FIG. 5 is a schematic view of an image capturing device according to the 3rd embodiment of the present disclosure.
Figure 6:
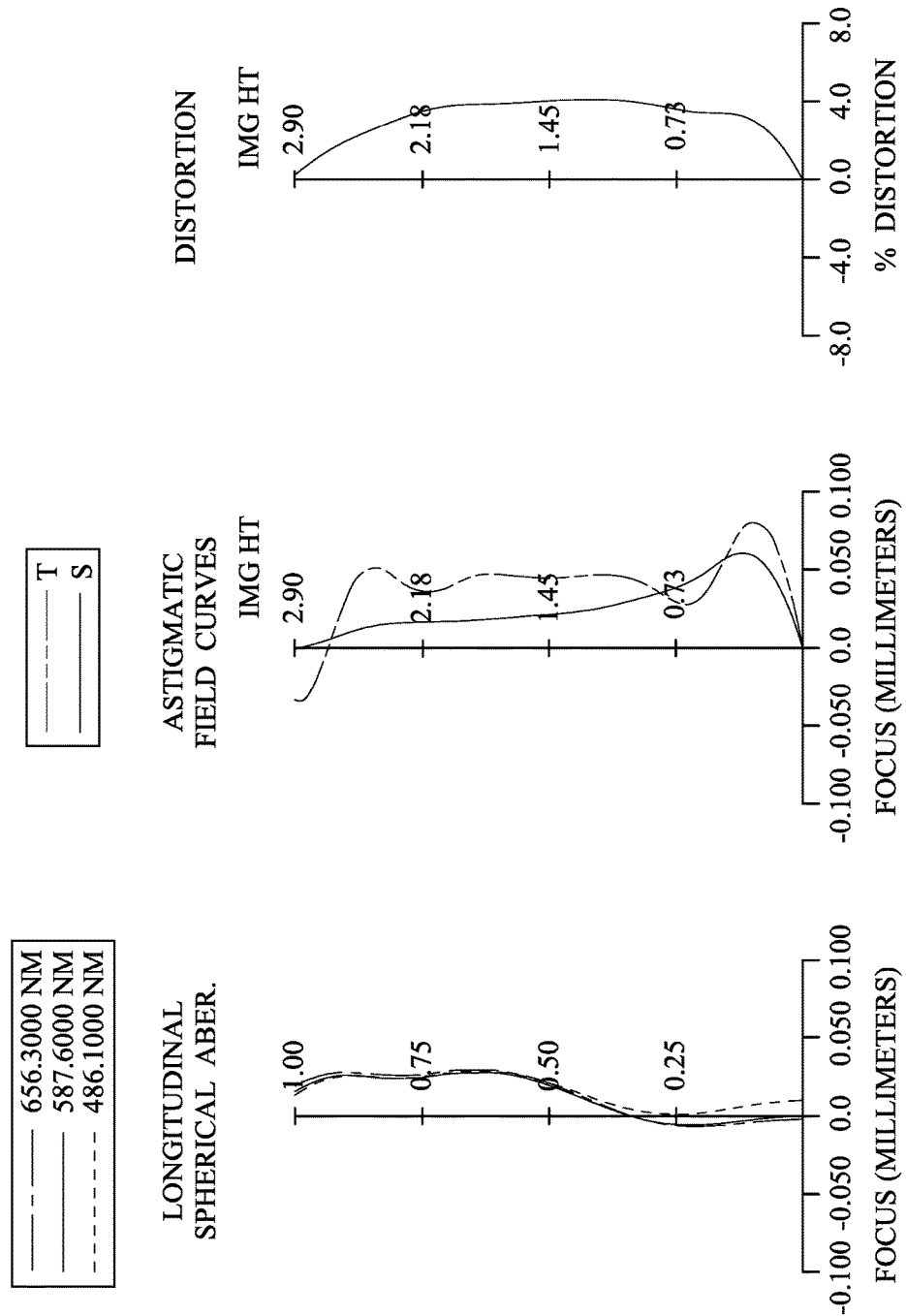
FIG. 6 shows spherical aberration curves, astigmatic field curves and a distortion curve of the image capturing device according to the 3rd embodiment.

FIG. 5 is a schematic view of an image capturing device according to the 3rd embodiment of the present disclosure. FIG. 6 shows spherical aberration curves, astigmatic field curves and a distortion curve of the image capturing device according to the 3rd embodiment. In FIG. 5, the image capturing device includes an optical image lens assembly (its reference numeral is omitted) and an image sensor 390. The optical image lens assembly includes, in order from an object side to an image side, a first lens element 310, an aperture stop 300, a second lens element 320, a third lens element 330, a fourth lens element 340, a fifth lens element 350, a sixth lens element 360, an IR-cut filter 370 and an image surface 380, wherein the image sensor 390 is disposed on the image surface 380 of the optical image lens assembly. The optical image lens assembly has a total of six lens elements (310-360), and there is an air space between every two lens elements of the first lens element 310, the second lens element 320, the third lens element 330, the fourth lens element 340, the fifth lens element 350 and the sixth lens element 360 that are adjacent to each other.

The first lens element 310 with positive refractive power has an object-side surface 311 being convex in a paraxial region thereof and an image-side surface 312 being concave in a paraxial region thereof. The first lens element 310 is made of a plastic material, and has the object-side surface 311 and the image-side surface 312 being both aspheric.

The second lens element 320 with positive refractive power has an object-side surface 321 being convex in a paraxial region thereof and an image-side surface 322 being convex in a paraxial region thereof. The second lens element 320 is made of a plastic material, and has the object-side surface 321 and the image-side surface 322 being both aspheric.

The third lens element 330 with negative refractive power has an object-side surface 331 being concave in a paraxial region thereof and an image-side surface 332 being convex in a paraxial region thereof. The third lens element 330 is made of a plastic material, and has the object-side surface 331 and the image-side surface 332 being both aspheric. Furthermore, the image-side surface 332 of the third lens element 330 includes at least one convex shape in an off-axial region thereof.

The fourth lens element 340 with positive refractive power has an object-side surface 341 being convex in a paraxial region thereof and an image-side surface 342 being concave in a paraxial region thereof. The fourth lens element 340 is made of a plastic material, and has the object-side surface 341 and the image-side surface 342 being both aspheric. Furthermore, the image-side surface 342 of the fourth lens element 340 includes at least one convex shape in an off-axial region thereof.

The fifth lens element 350 with positive refractive power has an object-side surface 351 being concave in a paraxial region thereof and an image-side surface 352 being convex in a paraxial region thereof. The fifth lens element 350 is made of a plastic material, and has the object-side surface 351 and the image-side surface 352 being both aspheric.

The sixth lens element 360 with negative refractive power has an object-side surface 361 being convex in a paraxial region thereof and an image-side surface 362 being concave in a paraxial region thereof. The sixth lens element 360 is made of a plastic material, and has the object-side surface 361 and the image-side surface 362 being both aspheric. Furthermore, the image-side surface 362 of the sixth lens element 360 includes at least one convex shape in an off-axial region thereof.

The IR-cut filter 370 is made of a glass material and located between the sixth lens element 360 and the image surface 380, and will not affect the focal length of the optical image lens assembly.

The detailed optical data of the 3rd embodiment are shown in Table 5 and the aspheric surface data are shown in Table 6 below.

TABLE 5

3rd Embodiment
f = 2.42 mm, Fno = 2.08, HFOV = 50.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.838 | ASP | 0.410 | Plastic | 1.583 | 30.2 | 11.40 |
| 2 | | 2.330 | ASP | 0.080 | | | | |
| 3 | Ape. Stop | Plano | | 0.061 | | | | |
| 4 | Lens 2 | 19.997 | ASP | 0.489 | Plastic | 1.544 | 55.9 | 2.49 |
| 5 | | −1.440 | ASP | 0.037 | | | | |
| 6 | Lens 3 | −2.072 | ASP | 0.245 | Plastic | 1.660 | 20.4 | −3.26 |

TABLE 5-continued

3rd Embodiment
f = 2.42 mm, Fno = 2.08, HFOV = 50.0 deg.

| Surface # | | Curvature Radius | | Thickness | Material | Index | Abbe # | Focal Length |
|---|---|---|---|---|---|---|---|---|
| 7 | | −59.685 | ASP | 0.040 | | | | |
| 8 | Lens 4 | 1.661 | ASP | 0.280 | Plastic | 1.544 | 55.9 | 15.12 |
| 9 | | 1.958 | ASP | 0.300 | | | | |
| 10 | Lens 5 | −1.423 | ASP | 0.911 | Plastic | 1.544 | 55.9 | 1.45 |
| 11 | | −0.622 | ASP | 0.040 | | | | |
| 12 | Lens 6 | 2.160 | ASP | 0.513 | Plastic | 1.660 | 20.4 | −2.04 |
| 13 | | 0.750 | ASP | 0.600 | | | | |
| 14 | IR-cut filter | Plano | | 0.210 | Glass | 1.517 | 64.2 | — |
| 15 | | Plano | | 0.284 | | | | |
| 16 | Image | Plano | | — | | | | |

Reference wavelength is 587.6 nm (d-line).

TABLE 6

Aspheric Coefficients

| Surface # | 1 | 2 | 4 | 5 | 6 | 7 |
|---|---|---|---|---|---|---|
| k = | −4.1040E−01 | −4.1194E+01 | 2.8630E+01 | −3.0290E+00 | −8.0646E+01 | −4.2570E+01 |
| A4 = | 1.1849E−03 | 3.3925E−01 | −1.2712E−01 | 6.0745E−01 | 3.9315E−01 | 1.8559E−01 |
| A6 = | −7.1697E−02 | −9.1908E−01 | 4.1987E−02 | −7.0356E+00 | −4.9663E+00 | −1.4987E+00 |
| A8 = | 1.6103E−01 | 7.9104E−01 | −1.2863E+00 | 2.2785E+01 | 1.4824E+01 | 3.8013E+00 |
| A10 = | −4.2626E−01 | 4.7133E−02 | 7.4883E−01 | −3.7683E+01 | −2.3290E+01 | −5.6249E+00 |
| A12 = | 3.0761E−01 | | | 2.4245E+01 | 1.3866E+01 | 4.2272E+00 |
| A14 = | | | | | | −1.2202E+00 |

| Surface # | 8 | 9 | 10 | 11 | 12 | 13 |
|---|---|---|---|---|---|---|
| k = | −2.7750E+01 | −4.6178E+01 | −1.4644E+00 | −1.3332E+00 | −8.9787E+01 | −7.0448E+00 |
| A4 = | −2.7542E−01 | 1.0490E−01 | −2.2235E−01 | 1.8391E−01 | 1.7665E−01 | 3.9007E−02 |
| A6 = | −3.5241E−01 | −6.0762E−01 | 1.1285E+00 | −3.5907E−01 | −2.1985E−01 | −6.0589E−02 |
| A8 = | 1.3011E−02 | 8.1641E−01 | −1.7177E+00 | 3.3578E−01 | 1.2665E−01 | 3.0340E−02 |
| A10 = | 1.1294E+00 | −4.6334E−01 | 1.8140E+00 | −2.3879E−01 | −4.2096E−02 | −8.3487E−03 |
| A12 = | −1.0260E+00 | 2.7296E−03 | −1.4254E+00 | 1.6147E−01 | 7.5311E−03 | 1.2837E−03 |
| A14 = | 2.6710E−01 | 5.0326E−02 | 6.3181E−01 | −6.3101E−02 | −5.8985E−04 | −1.0335E−04 |
| A16 = | | | −1.0989E−01 | 9.3837E−03 | 6.5861E−06 | 3.3717E−06 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 2.42 | (R1 + R2)/(R1 − R2) | −8.46 |
| Fno | 2.08 | (R3 + R4)/(R3 − R4) | 0.87 |
| HFOV [deg.] | 50.0 | (R9 − R10)/(R9 + R10) | 0.39 |
| V3/V2 | 0.36 | f/R1 + f/|R2| | 2.36 |
| (V3 + V6)/V5 | 0.73 | |f2/f3| | 0.76 |
| CT2/T12 | 3.47 | |f3/f4| | 0.22 |
| Td/ΣAT | 6.10 | f1/f2 | 4.58 |
| ImgH/f | 1.20 | | |

Furthermore, according to the 3rd embodiment, when the focal length of the first lens element 310 is f1, the focal length of the second lens element 320 is f2, the focal length of the third lens element 330 is f3, the focal length of the fourth lens element 340 is f4, a focal length of the fifth lens element 350 is f5, and a focal length of the sixth lens element 360 is f6, the following conditions are satisfied: |f1|<|f4|; |f2|<|f4|; |f3|<|f4|; |f5|<|f4|; and |f6|<|f4|.

4th Embodiment

Figure 7:
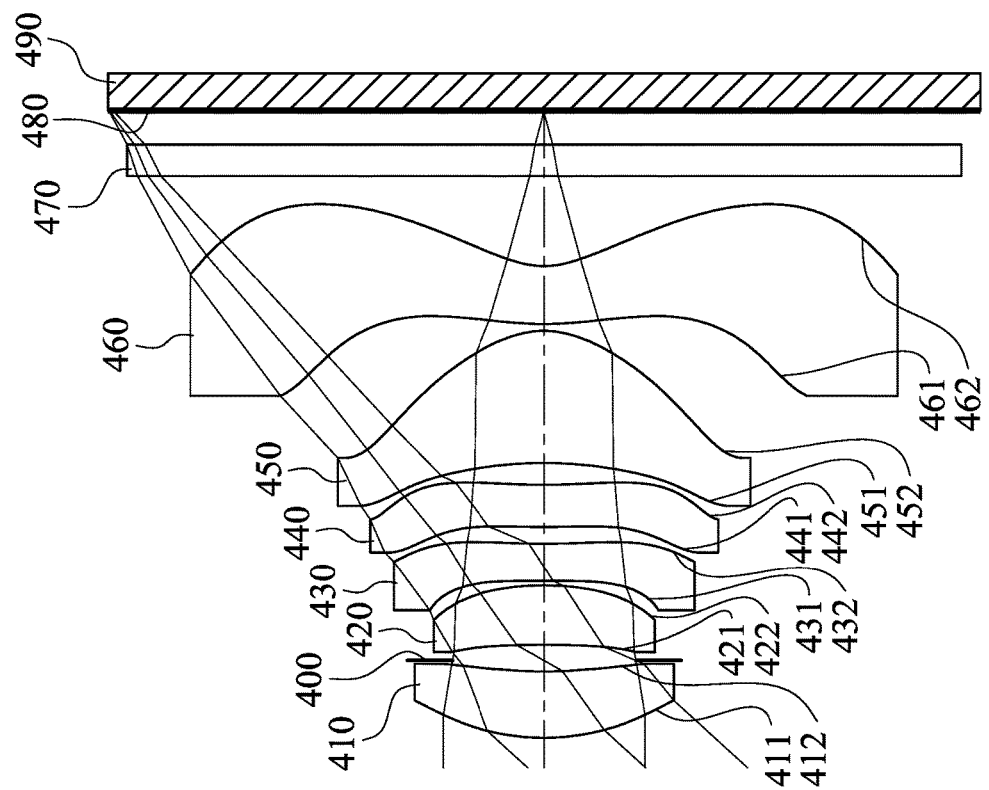
FIG. 7 is a schematic view of an image capturing device according to the 4th embodiment of the present disclosure.
Figure 8:
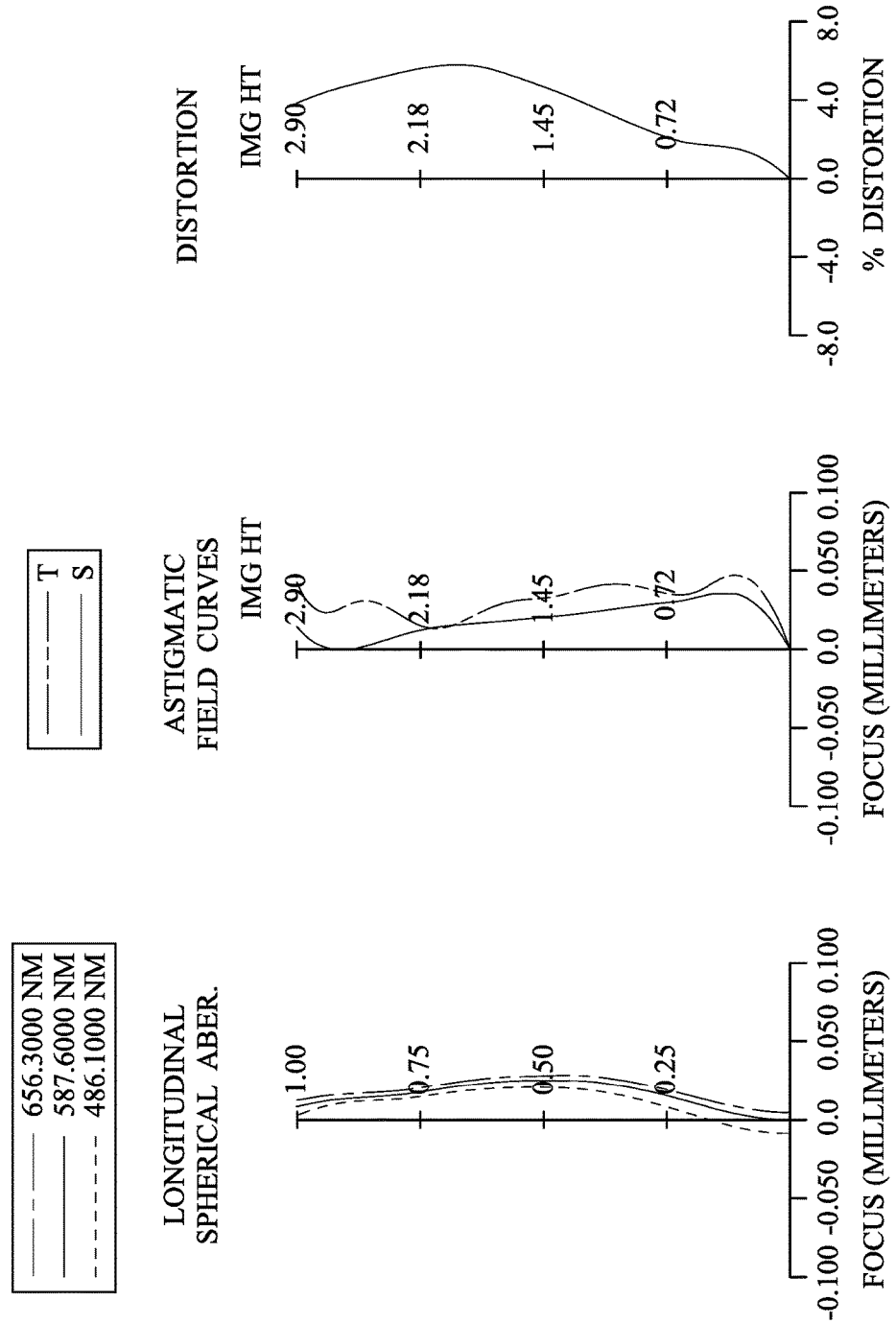
FIG. 8 shows spherical aberration curves, astigmatic field curves and a distortion curve of the image capturing device according to the 4th embodiment.

FIG. 7 is a schematic view of an image capturing device according to the 4th embodiment of the present disclosure. FIG. 8 shows spherical aberration curves, astigmatic field curves and a distortion curve of the image capturing device according to the 4th embodiment. In FIG. 7, the image capturing device includes an optical image lens assembly (its reference numeral is omitted) and an image sensor 490. The optical image lens assembly includes, in order from an object side to an image side, a first lens element 410, an aperture stop 400, a second lens element 420, a third lens element 430, a fourth lens element 440, a fifth lens element 450, a sixth lens element 460, an IR-cut filter 470 and an image surface 480, wherein the image sensor 490 is disposed on the image surface 480 of the optical image lens assembly. The optical image lens assembly has a total of six lens elements (410-460), and there is an air space between every two lens elements of the first lens element 410, the second lens element 420, the third lens element 430, the fourth lens element 440, the fifth lens element 450 and the sixth lens element 460 that are adjacent to each other.

The first lens element 410 with positive refractive power has an object-side surface 411 being convex in a paraxial region thereof and an image-side surface 412 being concave in a paraxial region thereof. The first lens element 410 is made of a plastic material, and has the object-side surface 411 and the image-side surface 412 being both aspheric.

The second lens element 420 with positive refractive power has an object-side surface 421 being concave in a paraxial region thereof and an image-side surface 422 being convex in a paraxial region thereof. The second lens element 420 is made of a plastic material, and has the object-side surface 421 and the image-side surface 422 being both aspheric.

The third lens element 430 with negative refractive power has an object-side surface 431 being concave in a paraxial region thereof and an image-side surface 432 being concave in a paraxial region thereof. The third lens element 430 is made of a plastic material, and has the object-side surface 431 and the image-side surface 432 being both aspheric. Furthermore, the image-side surface 432 of the third lens element 430 includes at least one convex shape in an off-axial region thereof.

The fourth lens element 440 with negative refractive power has an object-side surface 441 being convex in a paraxial region thereof and an image-side surface 442 being concave in a paraxial region thereof. The fourth lens element 440 is made of a plastic material, and has the object-side surface 441 and the image-side surface 442 being both aspheric. Furthermore, the image-side surface 442 of the fourth lens element 440 includes at least one convex shape in an off-axial region thereof.

The fifth lens element 450 with positive refractive power has an object-side surface 451 being concave in a paraxial region thereof and an image-side surface 452 being convex in a paraxial region thereof. The fifth lens element 450 is made of a plastic material, and has the object-side surface 451 and the image-side surface 452 being both aspheric.

The sixth lens element 460 with negative refractive power has an object-side surface 461 being convex in a paraxial region thereof and an image-side surface 462 being concave in a paraxial region thereof. The sixth lens element 460 is made of a plastic material, and has the object-side surface 461 and the image-side surface 462 being both aspheric. Furthermore, the image-side surface 462 of the sixth lens element 460 includes at least one convex shape in an off-axial region thereof.

The IR-cut filter 470 is made of a glass material and located between the sixth lens element 460 and the image surface 480, and will not affect the focal length of the optical image lens assembly.

The detailed optical data of the 4th embodiment are shown in Table 7 and the aspheric surface data are shown in Table 8 below.

TABLE 7

4th Embodiment
f = 2.54 mm, Fno = 1.89, HFOV = 47.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.571 | ASP | 0.443 | Plastic | 1.544 | 55.9 | 4.69 |
| 2 | | 3.684 | ASP | 0.072 | | | | |
| 3 | Ape. Stop | Plano | | 0.105 | | | | |
| 4 | Lens 2 | −7.093 | ASP | 0.396 | Plastic | 1.544 | 55.9 | 5.53 |
| 5 | | −2.153 | ASP | 0.031 | | | | |
| 6 | Lens 3 | −64.832 | ASP | 0.250 | Plastic | 1.660 | 20.4 | −6.81 |
| 7 | | 4.833 | ASP | 0.113 | | | | |
| 8 | Lens 4 | 6.152 | ASP | 0.280 | Plastic | 1.544 | 55.9 | −21.15 |
| 9 | | 3.944 | ASP | 0.146 | | | | |
| 10 | Lens 5 | −2.777 | ASP | 0.880 | Plastic | 1.544 | 55.9 | 1.27 |
| 11 | | −0.616 | ASP | 0.045 | | | | |
| 12 | Lens 6 | 1.796 | ASP | 0.390 | Plastic | 1.576 | 36.4 | −1.47 |
| 13 | | 0.530 | ASP | 0.600 | | | | |
| 14 | IR-cut filter | Plano | | 0.210 | Glass | 1.517 | 64.2 | — |
| 15 | | Plano | | 0.226 | | | | |
| 16 | Image | Plano | | — | | | | |

Reference wavelength is 587.6 nm (d-line).
Effective radius of Surface 11 is 1.375 mm.

TABLE 8

Aspheric Coefficients

| Surface # | 1 | 2 | 4 | 5 | 6 | 7 |
|---|---|---|---|---|---|---|
| k = | 3.8806E−01 | −2.0686E+01 | −1.1894E+01 | −3.8728E+00 | −9.0000E+01 | −6.9165E+01 |
| A4 = | 3.1918E−03 | 3.8720E−02 | −7.3617E−02 | −5.6101E−01 | −6.0897E−01 | −2.2355E−01 |
| A6 = | −3.4770E−02 | 1.5007E−02 | −1.4305E−01 | 1.6339E+00 | 1.5380E+00 | 1.9106E−01 |
| A8 = | 9.3345E−02 | −5.1553E−01 | −1.4626E−01 | −4.9427E+00 | −4.9250E+00 | −3.2132E−01 |
| A10 = | −1.6165E−01 | 4.4129E−01 | −2.0944E−01 | 6.8277E+00 | 6.9683E+00 | 5.2298E−02 |
| A12 = | | | | −4.0008E+00 | −4.8707E+00 | 1.8367E−01 |
| A14 = | | | | | | −7.1001E−02 |

TABLE 8-continued

| Aspheric Coefficients | | | | | | |
|---|---|---|---|---|---|---|
| Surface # | 8 | 9 | 10 | 11 | 12 | 13 |
| k = | −3.8939E+01 | −2.4429E+01 | −5.3677E−02 | −1.6632E+00 | −6.9037E+01 | −4.8536E+00 |
| A4 = | −4.1874E−01 | −2.3101E−01 | −6.5951E−03 | 3.2129E−01 | 3.4875E−02 | −6.0023E−02 |
| A6 = | 1.3896E−01 | 1.3286E−01 | 2.4241E−02 | −9.7452E−01 | −2.3076E−01 | −2.2081E−03 |
| A8 = | −2.8309E−01 | −2.1920E−01 | 1.5483E−01 | 1.3826E+00 | 1.9065E−01 | 1.2101E−02 |
| A10 = | 5.5587E−01 | 1.2656E−01 | −6.2336E−01 | −1.2815E+00 | −7.6828E−02 | −5.7736E−03 |
| A12 = | −2.3905E−01 | −8.3785E−02 | 6.3957E−01 | 7.4642E−01 | 1.1276E−02 | 1.2473E−03 |
| A14 = | 1.0260E−02 | 4.9684E−02 | −2.3663E−01 | −2.2554E−01 | 1.1160E−03 | −1.3333E−04 |
| A16 = | | | 2.4819E−02 | 2.6122E−02 | −3.3069E−04 | 5.7747E−06 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 2.54 | (R1 + R2)/(R1 − R2) | −2.49 |
| Fno | 1.89 | (R3 + R4)/(R3 − R4) | 1.87 |
| HFOV [deg.] | 47.5 | (R9 − R10)/(R9 + R10) | 0.64 |
| V3/V2 | 0.36 | f/R1 + f/|R2| | 2.31 |
| (V3 + V6)/V5 | 1.02 | |f2/f3| | 0.81 |
| CT2/T12 | 2.24 | |f3/f4| | 0.32 |
| Td/ΣAT | 6.15 | f1/f2 | 0.85 |
| ImgH/f | 1.14 | | |

Furthermore, according to the 4th embodiment, when the focal length of the first lens element 410 is f1, the focal length of the second lens element 420 is f2, the focal length of the third lens element 430 is f3, the focal length of the fourth lens element 440 is f4, a focal length of the fifth lens element 450 is f5, and a focal length of the sixth lens element 460 is f6, the following conditions are satisfied: |f1|<|f4|; |f2|<|f4|; |f3|<|f4|; |f5|<|f4|; and |f6|<|f4|.

5th Embodiment

Figure 9:
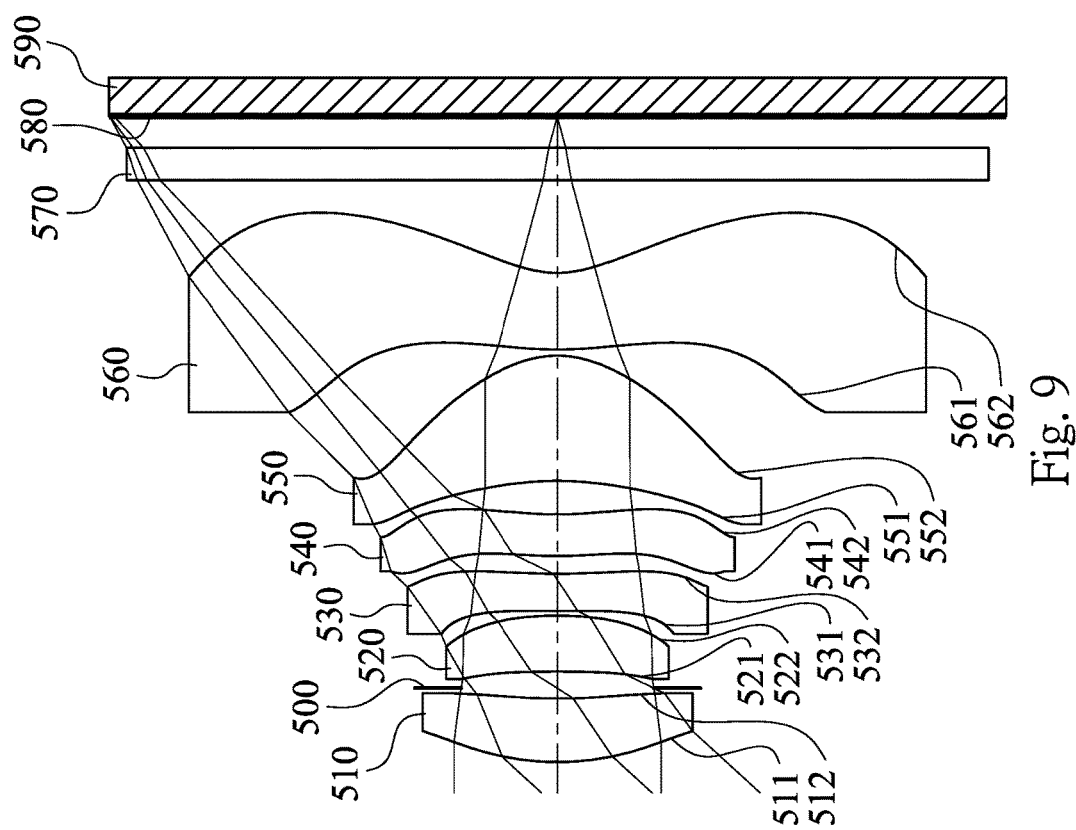
FIG. 9 is a schematic view of an image capturing device according to the 5th embodiment of the present disclosure.
Figure 10:
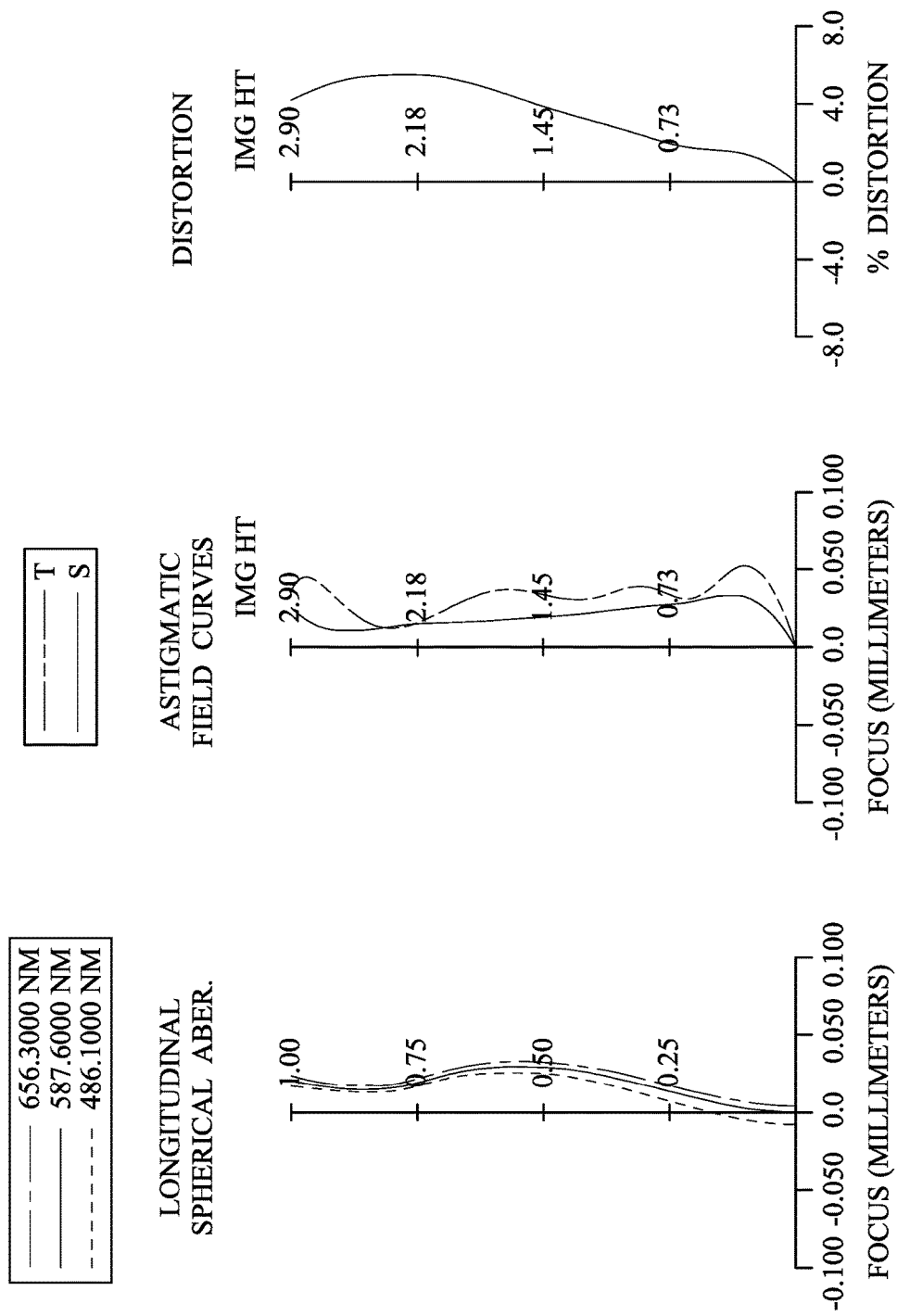
FIG. 10 shows spherical aberration curves, astigmatic field curves and a distortion curve of the image capturing device according to the 5th embodiment.

FIG. 9 is a schematic view of an image capturing device according to the 5th embodiment of the present disclosure. FIG. 10 shows spherical aberration curves, astigmatic field curves and a distortion curve of the image capturing device according to the 5th embodiment. In FIG. 9, the image capturing device includes an optical image lens assembly (its reference numeral is omitted) and an image sensor 590. The optical image lens assembly includes, in order from an object side to an image side, a first lens element 510, an aperture stop 500, a second lens element 520, a third lens element 530, a fourth lens element 540, a fifth lens element 550, a sixth lens element 560, an IR-cut filter 570 and an image surface 580, wherein the image sensor 590 is disposed on the image surface 580 of the optical image lens assembly. The optical image lens assembly has a total of six lens elements (510-560), and there is an air space between every two lens elements of the first lens element 510, the second lens element 520, the third lens element 530, the fourth lens element 540, the fifth lens element 550 and the sixth lens element 560 that are adjacent to each other.

The first lens element 510 with positive refractive power has an object-side surface 511 being convex in a paraxial region thereof and an image-side surface 512 being concave in a paraxial region thereof. The first lens element 510 is made of a plastic material, and has the object-side surface 511 and the image-side surface 512 being both aspheric.

The second lens element 520 with positive refractive power has an object-side surface 521 being concave in a paraxial region thereof and an image-side surface 522 being convex in a paraxial region thereof. The second lens element 520 is made of a plastic material, and has the object-side surface 521 and the image-side surface 522 being both aspheric.

The third lens element 530 with negative refractive power has an object-side surface 531 being convex in a paraxial region thereof and an image-side surface 532 being concave in a paraxial region thereof. The third lens element 530 is made of a plastic material, and has the object-side surface 531 and the image-side surface 532 being both aspheric. Furthermore, the image-side surface 532 of the third lens element 530 includes at least one convex shape in an off-axial region thereof.

The fourth lens element 540 with positive refractive power has an object-side surface 541 being convex in a paraxial region thereof and an image-side surface 542 being concave in a paraxial region thereof. The fourth lens element 540 is made of a plastic material, and has the object-side surface 541 and the image-side surface 542 being both aspheric. Furthermore, the image-side surface 542 of the fourth lens element 540 includes at least one convex shape in an off-axial region thereof.

The fifth lens element 550 with positive refractive power has an object-side surface 551 being concave in a paraxial region thereof and an image-side surface 552 being convex in a paraxial region thereof. The fifth lens element 550 is made of a plastic material, and has the object-side surface 551 and the image-side surface 552 being both aspheric.

The sixth lens element 560 with negative refractive power has an object-side surface 561 being convex in a paraxial region thereof and an image-side surface 562 being concave in a paraxial region thereof. The sixth lens element 560 is made of a plastic material, and has the object-side surface 561 and the image-side surface 562 being both aspheric. Furthermore, the image-side surface 562 of the sixth lens element 560 includes at least one convex shape in an off-axial region thereof.

The IR-cut filter 570 is made of a glass material and located between the sixth lens element 560 and the image surface 580, and will not affect the focal length of the optical image lens assembly.

The detailed optical data of the 5th embodiment are shown in Table 9 and the aspheric surface data are shown in Table 10 below.

TABLE 9

5th Embodiment
f = 2.54 mm, Fno = 1.89, HFOV = 47.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.750 | ASP | 0.412 | Plastic | 1.544 | 55.9 | 5.08 |
| 2 | | 4.384 | ASP | 0.066 | | | | |
| 3 | Ape. Stop | Plano | | 0.108 | | | | |
| 4 | Lens 2 | −7.437 | ASP | 0.362 | Plastic | 1.544 | 55.9 | 6.64 |
| 5 | | −2.471 | ASP | 0.030 | | | | |
| 6 | Lens 3 | 22.963 | ASP | 0.245 | Plastic | 1.660 | 20.4 | −7.79 |
| 7 | | 4.181 | ASP | 0.115 | | | | |
| 8 | Lens 4 | 2.698 | ASP | 0.270 | Plastic | 1.544 | 55.9 | 866.84 |
| 9 | | 2.618 | ASP | 0.216 | | | | |
| 10 | Lens 5 | −2.282 | ASP | 0.811 | Plastic | 1.544 | 55.9 | 1.50 |
| 11 | | −0.675 | ASP | 0.040 | | | | |
| 12 | Lens 6 | 2.264 | ASP | 0.500 | Plastic | 1.583 | 30.2 | −1.78 |
| 13 | | 0.653 | ASP | 0.600 | | | | |
| 14 | IR-cut filter | Plano | | 0.210 | Glass | 1.517 | 64.2 | — |
| 15 | | Plano | | 0.205 | | | | |
| 16 | Image | Plano | | — | | | | |

Reference wavelength is 587.6 nm (d-line).
Effective radius of Surface 11 is 1.320 mm.

TABLE 10

Aspheric Coefficients

| Surface # | 1 | 2 | 4 | 5 | 6 | 7 |
|---|---|---|---|---|---|---|
| k = | 3.5090E−01 | −4.1205E+01 | 2.8589E+01 | −3.0288E+00 | −8.0646E+01 | −4.2603E+01 |
| A4 = | 2.0407E−03 | 9.7330E−03 | −8.4349E−02 | −4.7480E−01 | −4.7314E−01 | −2.4028E−01 |
| A6 = | −1.5311E−01 | −4.5218E−02 | −2.1297E−01 | 9.7456E−01 | 1.1754E+00 | 5.4001E−01 |
| A8 = | 4.4213E−01 | −5.3666E−01 | 1.6985E−01 | −3.0807E+00 | −4.4916E+00 | −1.4776E+00 |
| A10 = | −8.3069E−01 | 7.3645E−01 | −2.5003E−01 | 5.0900E+00 | 7.7637E+00 | 2.0439E+00 |
| A12 = | 4.6457E−01 | | | −3.8918E+00 | −6.3890E+00 | −1.7119E+00 |
| A14 = | | | | | | 6.6847E−01 |

| Surface # | 8 | 9 | 10 | 11 | 12 | 13 |
|---|---|---|---|---|---|---|
| k = | −2.7726E+01 | −1.3062E+01 | −1.9707E+00 | −1.4588E+00 | −8.9802E+01 | −5.0501E+00 |
| A4 = | −4.2124E−01 | −2.1776E−01 | 9.9938E−04 | 1.5454E−01 | 4.2992E−02 | −6.3516E−02 |
| A6 = | 1.5364E−01 | 2.4565E−02 | 1.9611E−01 | −2.1761E−01 | −2.5011E−01 | 6.2235E−03 |
| A8 = | −9.8882E−02 | 8.7339E−03 | −7.5322E−01 | −2.1552E−01 | 2.3160E−01 | 6.8251E−03 |
| A10 = | −5.7366E−02 | 6.7631E−02 | 1.6383E+00 | 6.7642E−01 | −1.0894E−01 | −3.9389E−03 |
| A12 = | 3.8948E−01 | −2.1896E−01 | −2.0165E+00 | −6.3293E−01 | 2.3487E−02 | 9.0671E−04 |
| A14 = | −1.9578E−01 | 1.2259E−01 | 1.2090E+00 | 2.9289E−01 | −1.1284E−03 | −1.0116E−04 |
| A16 = | | | −2.7159E−01 | −5.3969E−02 | −1.7368E−04 | 4.5113E−06 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 2.54 | (R1 + R2)/(R1 − R2) | −2.33 |
| Fno | 1.89 | (R3 + R4)/(R3 − R4) | 2.00 |
| HFOV [deg.] | 47.5 | (R9 − R10)/(R9 + R10) | 0.54 |
| V3/V2 | 0.36 | f/R1 + f/|R2| | 2.03 |
| (V3 + V6)/V5 | 0.91 | |f2/f3| | 0.85 |
| CT2/T12 | 2.08 | |f3/f4| | 0.01 |

-continued

| 5th Embodiment | | | |
|---|---|---|---|
| Td/ΣAT | 5.52 | f1/f2 | 0.77 |
| ImgH/f | 1.14 | | |

Furthermore, according to the 5th embodiment, when the focal length of the first lens element 510 is f1, the focal length of the second lens element 520 is f2, the focal length of the third lens element 530 is f3, the focal length of the fourth lens element 540 is f4, a focal length of the fifth lens element 550 is f5, and a focal length of the sixth lens element 560 is f6, the following conditions are satisfied: |f1|<|f4|; |f2|<|f4|; |f3|<|f4|; |f5|<|f4|; and |f6|<|f4|.

6th Embodiment

Figure 11:
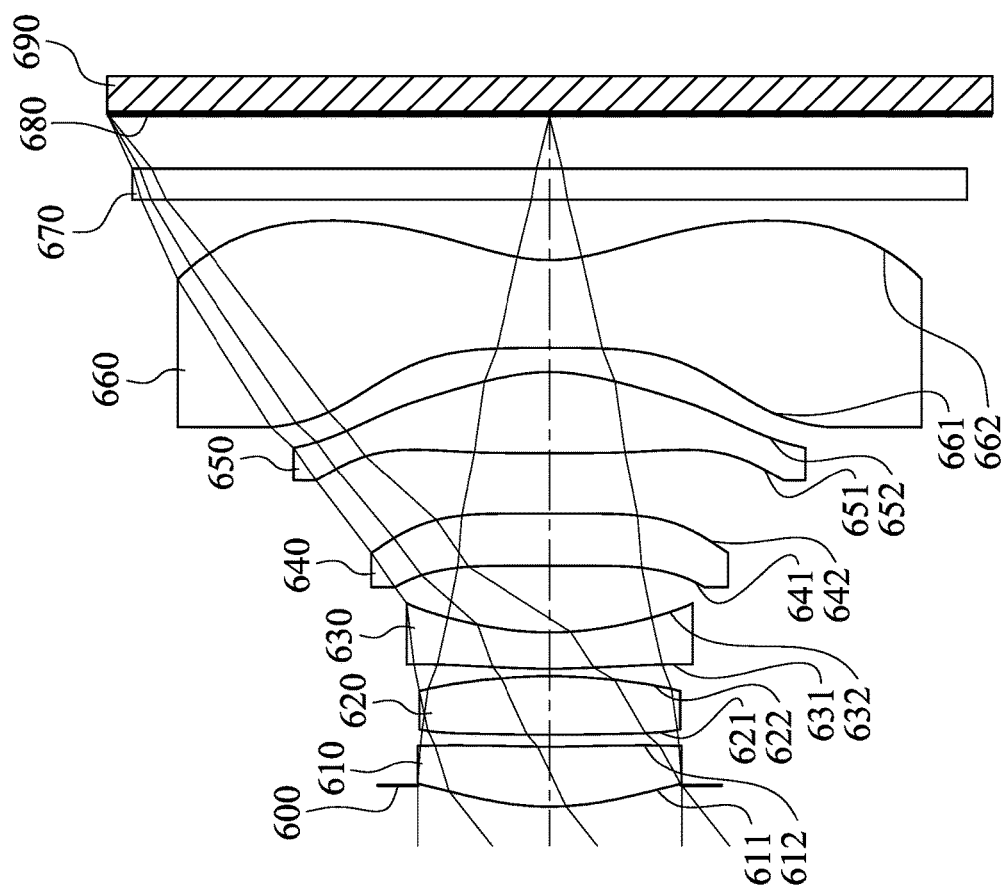
FIG. 11 is a schematic view of an image capturing device according to the 6th embodiment of the present disclosure.

FIG. 11 is a schematic view of an image capturing device according to the 6th embodiment of the present disclosure.

Figure 12:
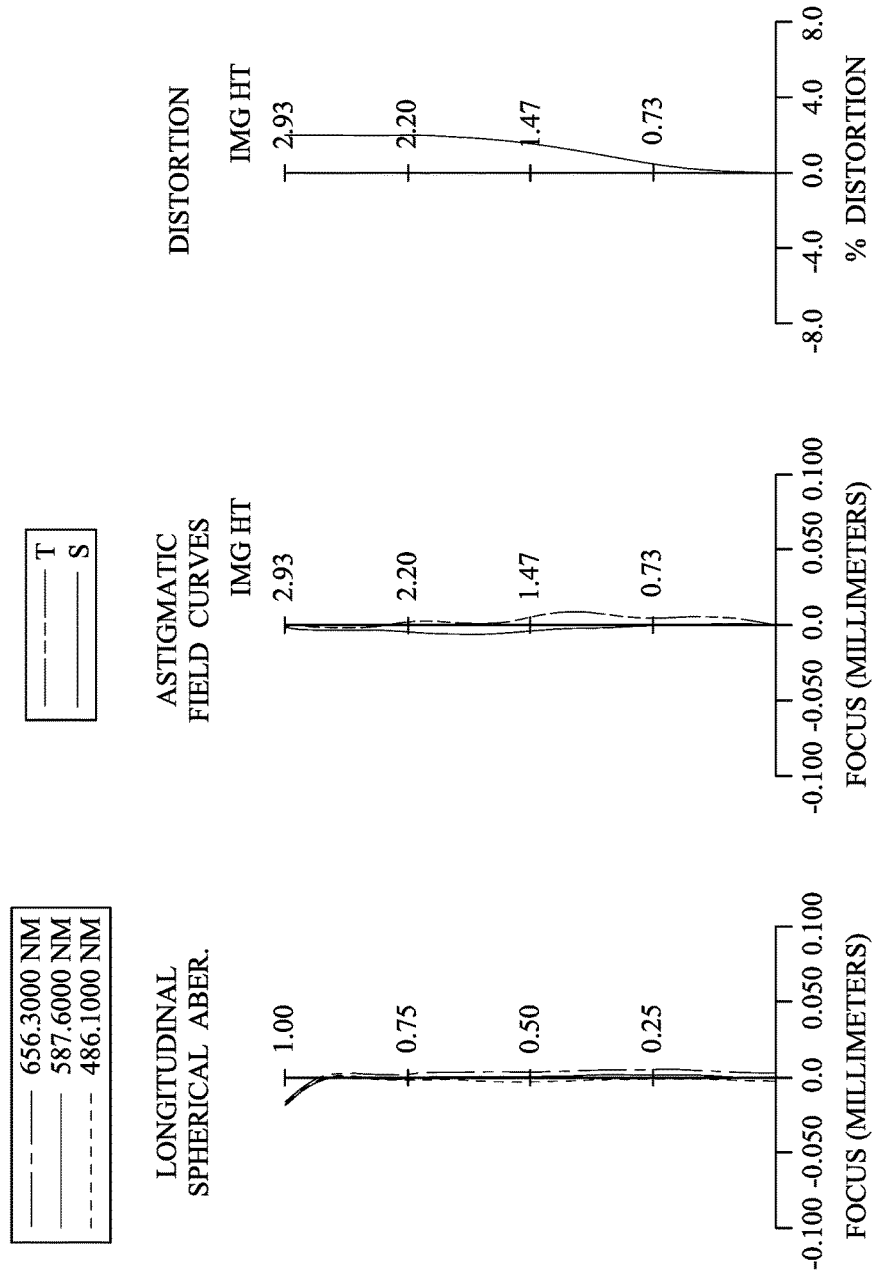
FIG. 12 shows spherical aberration curves, astigmatic field curves and a distortion curve of the image capturing device according to the 6th embodiment.

FIG. 12 shows spherical aberration curves, astigmatic field curves and a distortion curve of the image capturing device according to the 6th embodiment. In FIG. 11, the image capturing device includes an optical image lens assembly (its reference numeral is omitted) and an image sensor 690. The optical image lens assembly includes, in order from an object side to an image side, an aperture stop 600, a first lens element 610, a second lens element 620, a third lens element 630, a fourth lens element 640, a fifth lens element 650, a sixth lens element 660, an IR-cut filter 670 and an image surface 680, wherein the image sensor 690 is disposed on the image surface 680 of the optical image lens assembly. The optical image lens assembly has a total of six lens elements (610-660), and there is an air space between every two lens elements of the first lens element 610, the second lens element 620, the third lens element 630, the fourth lens element 640, the fifth lens element 650 and the sixth lens element 660 that are adjacent to each other.

The first lens element 610 with positive refractive power has an object-side surface 611 being convex in a paraxial region thereof and an image-side surface 612 being concave in a paraxial region thereof. The first lens element 610 is made of a plastic material, and has the object-side surface 611 and the image-side surface 612 being both aspheric.

The second lens element 620 with positive refractive power has an object-side surface 621 being convex in a paraxial region thereof and an image-side surface 622 being convex in a paraxial region thereof. The second lens element 620 is made of a plastic material, and has the object-side surface 621 and the image-side surface 622 being both aspheric.

The third lens element 630 with negative refractive power has an object-side surface 631 being convex in a paraxial region thereof and an image-side surface 632 being concave in a paraxial region thereof. The third lens element 630 is made of a plastic material, and has the object-side surface 631 and the image-side surface 632 being both aspheric.

The fourth lens element 640 with positive refractive power has an object-side surface 641 being convex in a paraxial region thereof and an image-side surface 642 being concave in a paraxial region thereof. The fourth lens element 640 is made of a plastic material, and has the object-side surface 641 and the image-side surface 642 being both aspheric. Furthermore, the image-side surface 642 of the fourth lens element 640 includes at least one convex shape in an off-axial region thereof.

The fifth lens element 650 with positive refractive power has an object-side surface 651 being concave in a paraxial region thereof and an image-side surface 652 being convex in a paraxial region thereof. The fifth lens element 650 is made of a plastic material, and has the object-side surface 651 and the image-side surface 652 being both aspheric.

The sixth lens element 660 with negative refractive power has an object-side surface 661 being concave in a paraxial region thereof and an image-side surface 662 being concave in a paraxial region thereof. The sixth lens element 660 is made of a plastic material, and has the object-side surface 661 and the image-side surface 662 being both aspheric. Furthermore, the image-side surface 662 of the sixth lens element 660 includes at least one convex shape in an off-axial region thereof.

The IR-cut filter 670 is made of a glass material and located between the sixth lens element 660 and the image surface 680, and will not affect the focal length of the optical image lens assembly.

The detailed optical data of the 6th embodiment are shown in Table 11 and the aspheric surface data are shown in Table 12 below.

TABLE 11

6th Embodiment
f = 3.64 mm, Fno = 2.08, HFOV = 38.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.140 | | | | |
| 2 | Lens 1 | 1.993 | ASP | 0.400 | Plastic | 1.544 | 55.9 | 4.91 |
| 3 | | 7.299 | ASP | 0.080 | | | | |
| 4 | Lens 2 | 12.573 | ASP | 0.387 | Plastic | 1.544 | 55.9 | 5.48 |
| 5 | | −3.862 | ASP | 0.050 | | | | |
| 6 | Lens 3 | 5.844 | ASP | 0.240 | Plastic | 1.660 | 20.4 | −4.88 |
| 7 | | 2.041 | ASP | 0.442 | | | | |
| 8 | Lens 4 | 34.452 | ASP | 0.346 | Plastic | 1.583 | 30.2 | 96.16 |
| 9 | | 88.957 | ASP | 0.404 | | | | |
| 10 | Lens 5 | −96.971 | ASP | 0.537 | Plastic | 1.544 | 55.9 | 2.35 |
| 11 | | −1.264 | ASP | 0.161 | | | | |
| 12 | Lens 6 | −19.641 | ASP | 0.580 | Plastic | 1.544 | 55.9 | −1.82 |
| 13 | | 1.051 | ASP | 0.400 | | | | |
| 14 | IR-cut filter | Plano | | 0.210 | Glass | 1.517 | 64.2 | — |
| 15 | | Plano | | 0.362 | | | | |
| 16 | Image | Plano | | — | | | | |

Reference wavelength is 587.6 nm (d-line).
Effective radius of Surface 6 is 0.900 mm.

TABLE 12

Aspheric Coefficients

| Surface # | 2 | 3 | 4 | 5 | 6 | 7 |
|---|---|---|---|---|---|---|
| k = | −1.7676E+00 | 4.1365E+01 | −4.0466E+01 | −6.4965E+01 | 4.4826E+00 | 1.2843E+00 |
| A4 = | −2.3303E−02 | −1.4152E−01 | −7.7861E−02 | −6.9569E−02 | −3.9605E−02 | −1.3279E−01 |

TABLE 12-continued

| Aspheric Coefficients | | | | | | |
|---|---|---|---|---|---|---|
| A6 = | −2.1029E−02 | −2.1231E−02 | 3.4944E−02 | −3.5328E−02 | −1.2894E−01 | 1.2000E−01 |
| A8 = | −7.2917E−02 | 1.5744E−01 | 1.9389E−01 | 2.3263E−01 | 2.2839E−01 | −2.1210E−01 |
| A10 = | 4.7624E−02 | −1.9157E−01 | −1.3714E−01 | −5.0542E−01 | −2.6515E−01 | 2.9793E−01 |
| A12 = | −4.7687E−03 | 3.0087E−01 | 1.4510E−01 | 5.5354E−01 | 2.4064E−01 | −2.0723E−01 |
| A14 = | 4.0362E−03 | −2.0278E−01 | −1.3147E−01 | −2.4425E−01 | −9.7955E−02 | 6.1362E−02 |

| Surface # | 8 | 9 | 10 | 11 | 12 | 13 |
|---|---|---|---|---|---|---|
| k = | 2.0000E−01 | 2.0000E+01 | −1.0001E+00 | −6.3148E+00 | 9.0000E+01 | −6.1361E+00 |
| A4 = | −1.1437E−01 | −9.3368E−02 | 1.5437E−01 | 9.2905E−02 | −1.1410E−01 | −9.3815E−02 |
| A6 = | −1.4765E−01 | −1.8200E−01 | −2.1261E−01 | −9.1931E−02 | −7.5689E−02 | 4.0481E−02 |
| A8 = | 4.2302E−01 | 2.5228E−01 | 1.1980E−01 | 5.0231E−03 | 7.5124E−02 | −1.3111E−02 |
| A10 = | −6.3705E−01 | −1.6790E−01 | −4.7933E−02 | 2.1835E−02 | −1.3047E−02 | 3.0547E−03 |
| A12 = | 4.5648E−01 | 1.9713E−02 | 1.0965E−02 | −8.7235E−03 | −2.9724E−03 | −5.0462E−04 |
| A14 = | −1.2291E−01 | 3.0755E−02 | −5.0670E−04 | 1.2469E−03 | 1.1954E−03 | 5.0175E−05 |
| A16 = | | −8.4157E−03 | −1.2874E−04 | −6.0136E−05 | −1.0703E−04 | −2.1647E−06 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 3.64 | (R1 + R2)/(R1 − R2) | −1.75 |
| Fno | 2.08 | (R3 + R4)/(R3 − R4) | 0.53 |
| HFOV [deg.] | 38.3 | (R9 − R10)/(R9 + R10) | 0.97 |
| V3/V2 | 0.36 | f/R1 + f/|R2| | 2.33 |
| (V3 + V6)/V5 | 1.36 | |f2/f3| | 1.12 |
| CT2/T12 | 4.84 | |f3/f4| | 0.05 |
| Td/ΣAT | 3.19 | f1/f2 | 0.90 |
| ImgH/f | 0.81 | | |

Furthermore, according to the 6th embodiment, when the focal length of the first lens element 610 is f1, the focal length of the second lens element 620 is f2, the focal length of the third lens element 630 is f3, the focal length of the fourth lens element 640 is f4, a focal length of the fifth lens element 650 is f5, and a focal length of the sixth lens element 660 is f6, the following conditions are satisfied: |f1|<|f4|; |f2|<|f4|; |f3|<|f4|; |f5|<|f4|; and |f6|<|f4|.

7th Embodiment

Figure 13:
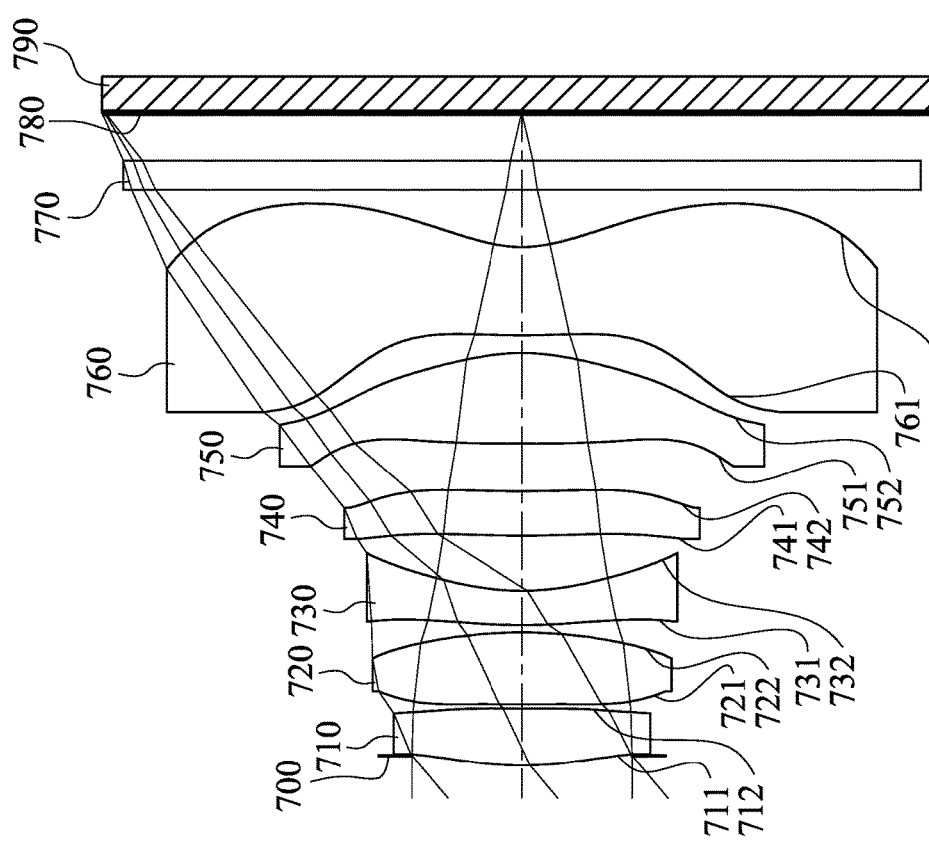
FIG. 13 is a schematic view of an image capturing device according to the 7th embodiment of the present disclosure.
Figure 14:
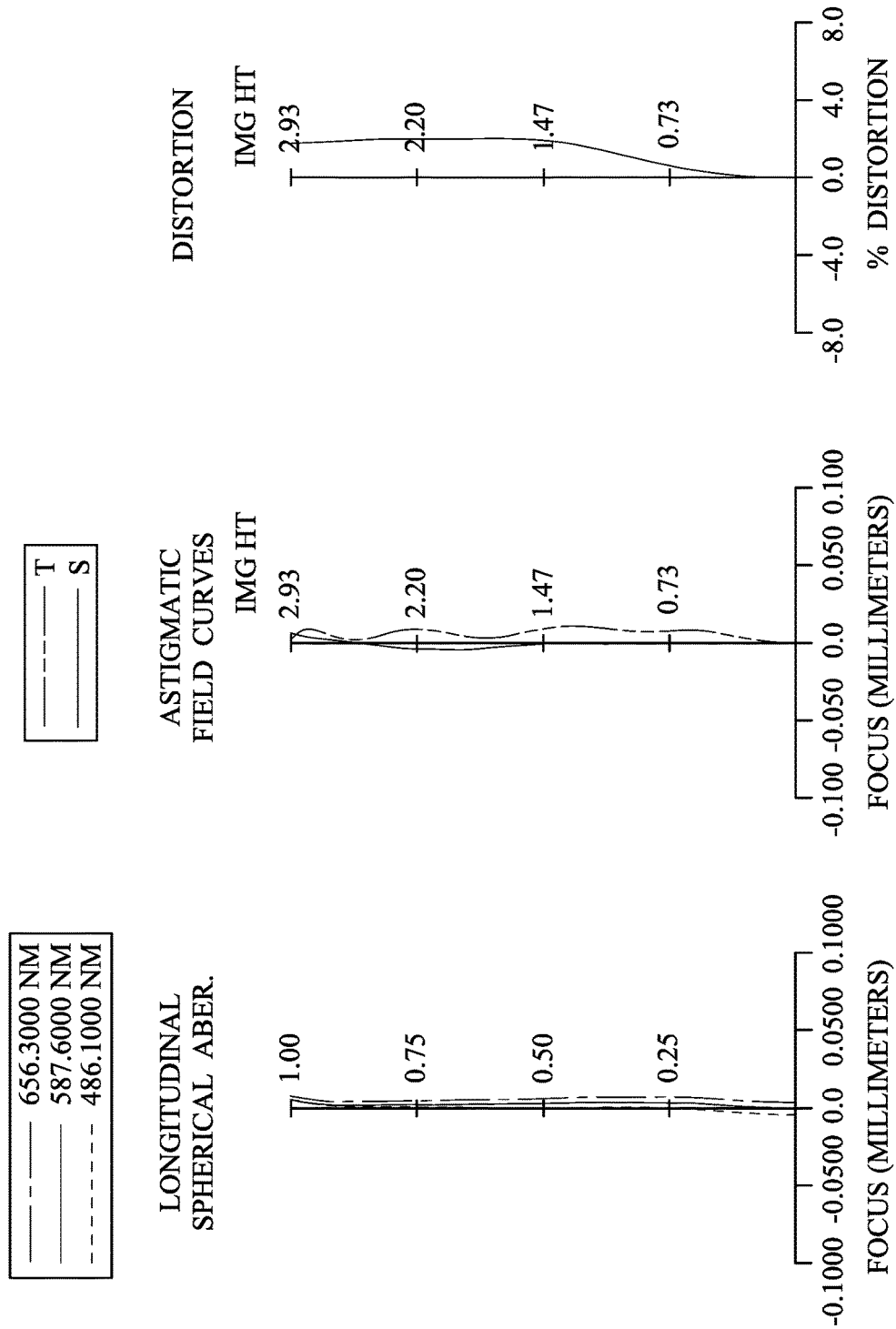
FIG. 14 shows spherical aberration curves, astigmatic field curves and a distortion curve of the image capturing device according to the 7th embodiment.

FIG. 13 is a schematic view of an image capturing device according to the 7th embodiment of the present disclosure. FIG. 14 shows spherical aberration curves, astigmatic field curves and a distortion curve of the image capturing device according to the 7th embodiment. In FIG. 13, the image capturing device includes an optical image lens assembly (its reference numeral is omitted) and an image sensor 790. The optical image lens assembly includes, in order from an object side to an image side, an aperture stop 700, a first lens element 710, a second lens element 720, a third lens element 730, a fourth lens element 740, a fifth lens element 750, a sixth lens element 760, an IR-cut filter 770 and an image surface 780, wherein the image sensor 790 is disposed on the image surface 780 of the optical image lens assembly. The optical image lens assembly has a total of six lens elements (710-760), and there is an air space between every two lens elements of the first lens element 710, the second lens element 720, the third lens element 730, the fourth lens element 740, the fifth lens element 750 and the sixth lens element 760 that are adjacent to each other.

The first lens element 710 with positive refractive power has an object-side surface 711 being convex in a paraxial region thereof and an image-side surface 712 being concave in a paraxial region thereof. The first lens element 710 is made of a plastic material, and has the object-side surface 711 and the image-side surface 712 being both aspheric.

The second lens element 720 with positive refractive power has an object-side surface 721 being convex in a paraxial region thereof and an image-side surface 722 being convex in a paraxial region thereof. The second lens element 720 is made of a plastic material, and has the object-side surface 721 and the image-side surface 722 being both aspheric.

The third lens element 730 with negative refractive power has an object-side surface 731 being convex in a paraxial region thereof and an image-side surface 732 being concave in a paraxial region thereof. The third lens element 730 is made of a plastic material, and has the object-side surface 731 and the image-side surface 732 being both aspheric.

The fourth lens element 740 with positive refractive power has an object-side surface 741 being convex in a paraxial region thereof and an image-side surface 742 being concave in a paraxial region thereof. The fourth lens element 740 is made of a plastic material, and has the object-side surface 741 and the image-side surface 742 being both aspheric. Furthermore, the image-side surface 742 of the fourth lens element 740 includes at least one convex shape in an off-axial region thereof.

The fifth lens element 750 with positive refractive power has an object-side surface 751 being concave in a paraxial region thereof and an image-side surface 752 being convex in a paraxial region thereof. The fifth lens element 750 is made of a plastic material, and has the object-side surface 751 and the image-side surface 752 being both aspheric.

The sixth lens element 760 with negative refractive power has an object-side surface 761 being convex in a paraxial region thereof and an image-side surface 762 being concave in a paraxial region thereof. The sixth lens element 760 is made of a plastic material, and has the object-side surface 761 and the image-side surface 762 being both aspheric. Furthermore, the image-side surface 762 of the sixth lens element 760 includes at least one convex shape in an off-axial region thereof.

The IR-cut filter 770 is made of a glass material and located between the sixth lens element 760 and the image surface 780, and will not affect the focal length of the optical image lens assembly.

The detailed optical data of the 7th embodiment are shown in Table 13 and the aspheric surface data are shown in Table 14 below.

TABLE 13

7th Embodiment
f = 3.43 mm, Fno = 2.22, HFOV = 40.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.069 | | | | |
| 2 | Lens 1 | 2.549 | ASP | 0.400 | Plastic | 1.544 | 55.9 | 5.46 |
| 3 | | 16.883 | ASP | 0.030 | | | | |
| 4 | Lens 2 | 15.699 | ASP | 0.506 | Plastic | 1.544 | 55.9 | 5.05 |
| 5 | | −3.294 | ASP | 0.050 | | | | |
| 6 | Lens 3 | 3.759 | ASP | 0.240 | Plastic | 1.660 | 20.4 | −5.05 |
| 7 | | 1.721 | ASP | 0.388 | | | | |
| 8 | Lens 4 | 7.160 | ASP | 0.313 | Plastic | 1.583 | 30.2 | 104.29 |
| 9 | | 7.984 | ASP | 0.338 | | | | |
| 10 | Lens 5 | −76.201 | ASP | 0.636 | Plastic | 1.544 | 55.9 | 2.77 |
| 11 | | −1.481 | ASP | 0.123 | | | | |
| 12 | Lens 6 | 4.955 | ASP | 0.620 | Plastic | 1.544 | 55.9 | −2.24 |
| 13 | | 0.935 | ASP | 0.400 | | | | |
| 14 | IR-cut filter | Plano | | 0.210 | Glass | 1.517 | 64.2 | — |
| 15 | | Plano | | 0.338 | | | | |
| 16 | Image | Plano | | — | | | | |

Reference wavelength is 587.6 nm (d-line).

TABLE 14

Aspheric Coefficients

| Surface # | 2 | 3 | 4 | 5 | 6 | 7 |
|---|---|---|---|---|---|---|
| k = | −5.6336E+00 | −5.0000E+01 | −4.0466E+01 | −6.4950E+01 | −1.4713E+01 | 3.4805E−01 |
| A4 = | −4.4279E−02 | −3.3447E−01 | −2.3962E−01 | −2.3449E−01 | −1.5096E−01 | −2.1200E−01 |
| A6 = | −4.1180E−02 | 4.6442E−01 | 5.0294E−01 | 7.0020E−01 | 3.6813E−01 | 2.9980E−01 |
| A8 = | −9.8324E−02 | −3.0521E−02 | 1.7820E−01 | −1.6415E+00 | −1.0291E+00 | −5.5722E−01 |
| A10 = | 1.2782E−01 | −3.0820E−01 | −8.5788E−01 | 2.2749E+00 | 1.5219E+00 | 6.6474E−01 |
| A12 = | −4.3430E−03 | 5.6720E−02 | 6.0241E−01 | −1.6318E+00 | −1.0734E+00 | −4.0160E−01 |
| A14 = | −3.5159E−02 | 9.2771E−02 | −1.2805E−01 | 4.5587E−01 | 2.8641E−01 | 9.5013E−02 |

| Surface # | 8 | 9 | 10 | 11 | 12 | 13 |
|---|---|---|---|---|---|---|
| k = | −4.0189E−01 | 5.1358E+00 | −1.0001E+00 | −2.2364E+00 | −9.0000E+01 | −4.9200E+00 |
| A4 = | −8.5317E−02 | −4.8393E−02 | 1.9451E−01 | 2.2585E−01 | −1.8724E−01 | −1.0117E−01 |
| A6 = | −1.3189E−01 | −2.5843E−01 | −2.6108E−01 | −2.1238E−01 | 3.6746E−02 | 4.3310E−02 |
| A8 = | 4.3396E−01 | 3.7979E−01 | 1.1326E−01 | 4.7545E−02 | −9.5437E−02 | −1.4819E−02 |
| A10 = | −5.4457E−01 | −2.4547E−01 | 9.6863E−03 | 2.3321E−02 | 1.0472E−02 | 3.6450E−03 |
| A12 = | 3.2042E−01 | 3.9778E−02 | −3.4904E−02 | −1.3014E−02 | −4.2850E−02 | −5.8560E−04 |
| A14 = | −7.0672E−02 | 2.6315E−02 | 1.3453E−02 | 2.1489E−03 | 7.8329E−03 | 5.2083E−05 |
| A16 = | | −7.6246E−03 | −1.5651E−03 | −1.1816E−04 | −5.4547E−04 | −1.9212E−06 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 3.43 | (R1 + R2)/(R1 − R2) | −1.36 |
| Fno | 2.22 | (R3 + R4)/(R3 − R4) | 0.65 |
| HFOV [deg.] | 40.0 | (R9 − R10)/(R9 + R10) | 0.96 |
| V3/V2 | 0.36 | f/R1 + f/|R2| | 1.55 |

-continued

| 7th Embodiment | | | |
|---|---|---|---|
| (V3 + V6)/V5 | 1.36 | |f2/f3| | 1.00 |
| CT2/T12 | 16.87 | |f3/f4| | 0.05 |
| Td/ΣAT | 3.92 | f1/f2 | 1.08 |
| ImgH/f | 0.86 | | |

Furthermore, according to the 7th embodiment, when the focal length of the first lens element 710 is f1, the focal length of the second lens element 720 is f2, the focal length of the third lens element 730 is f3, the focal length of the fourth lens element 740 is f4, a focal length of the fifth lens element 750 is f5, and a focal length of the sixth lens element 760 is f6, the following conditions are satisfied: |f1|<|f4|; |f2|<|f4|; |f3|<|f4|; |f5|<|f4|; and |f6|<|f4|.

8th Embodiment

Figure 15:
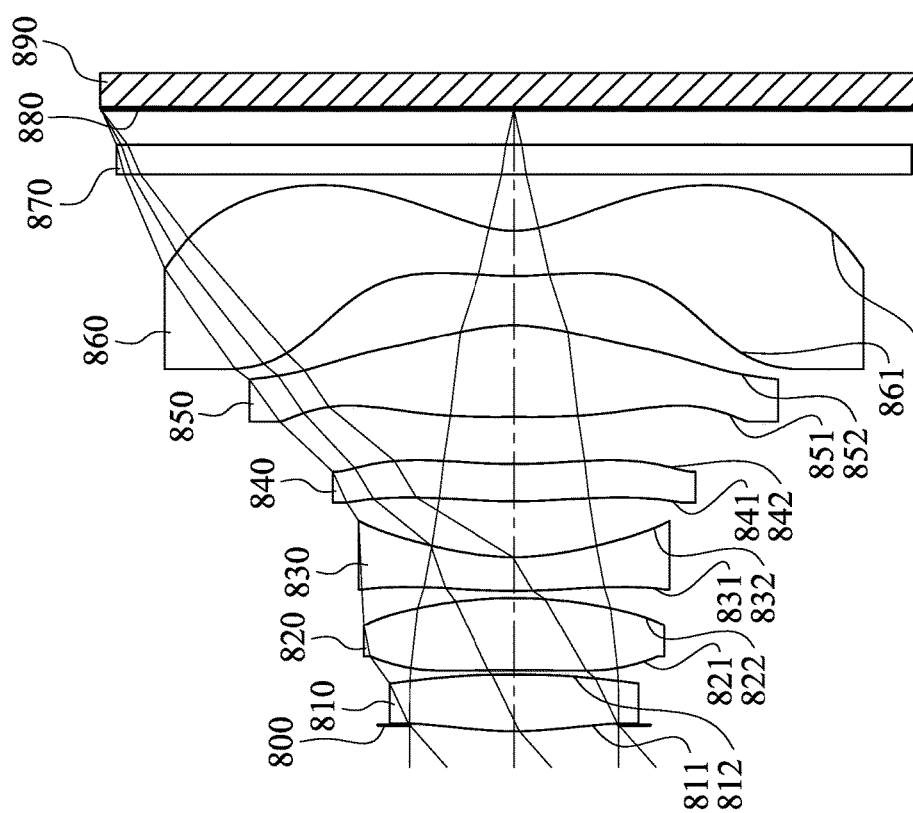
FIG. 15 is a schematic view of an image capturing device according to the 8th embodiment of the present disclosure.
Figure 16:
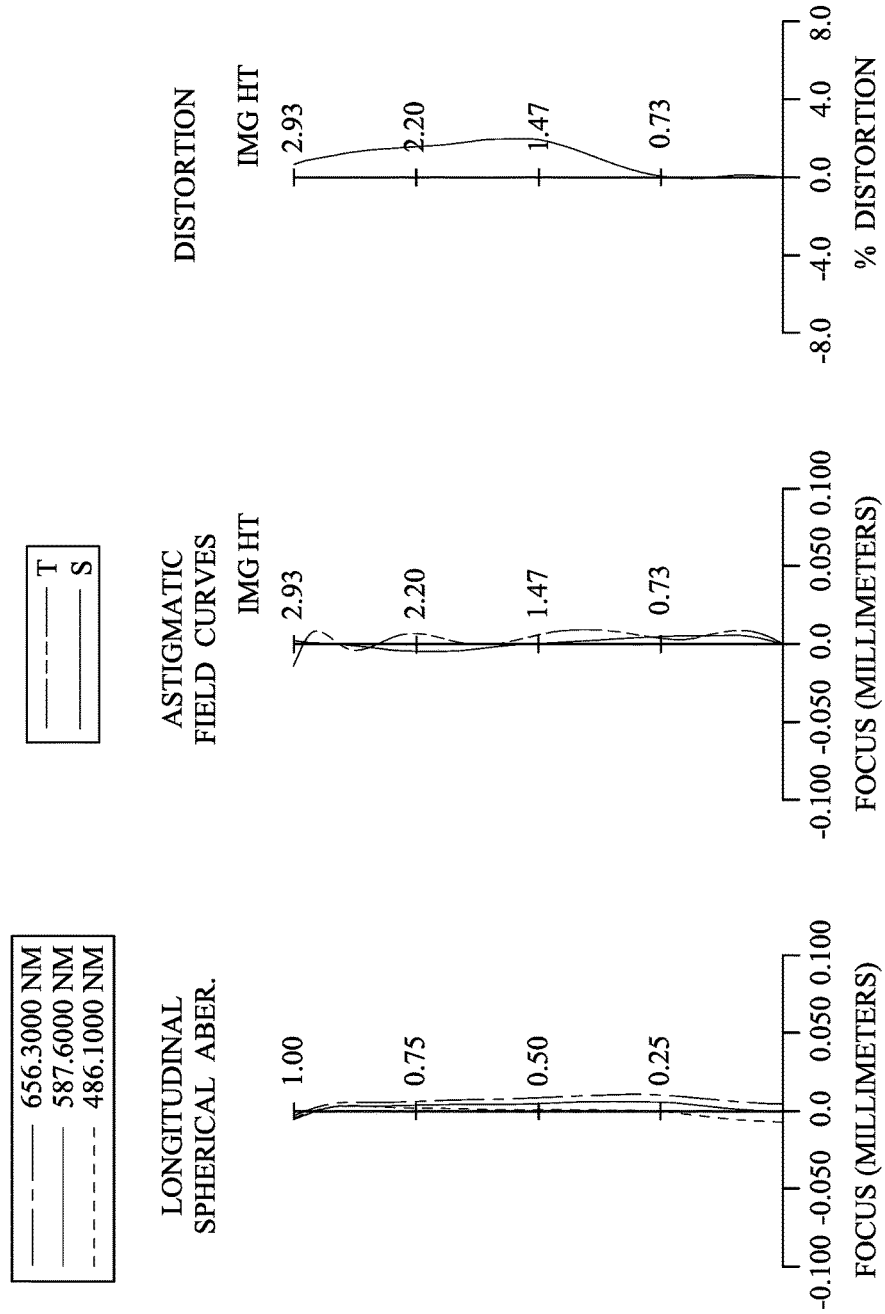
FIG. 16 shows spherical aberration curves, astigmatic field curves and a distortion curve of the image capturing device according to the 8th embodiment.

FIG. 15 is a schematic view of an image capturing device according to the 8th embodiment of the present disclosure. FIG. 16 shows spherical aberration curves, astigmatic field curves and a distortion curve of the image capturing device according to the 8th embodiment. In FIG. 15, the image capturing device includes an optical image lens assembly (its reference numeral is omitted) and an image sensor 890. The optical image lens assembly includes, in order from an object side to an image side, an aperture stop 800, a first lens element 810, a second lens element 820, a third lens element 830, a fourth lens element 840, a fifth lens element 850, a sixth lens element 860, an IR-cut filter 870 and an image surface 880, wherein the image sensor 890 is disposed on the image surface 880 of the optical image lens assembly. The optical image lens assembly has a total of six lens elements (810-860), and there is an air space between every two lens elements of the first lens element 810, the second lens element 820, the third lens element 830, the fourth lens element 840, the fifth lens element 850 and the sixth lens element 860 that are adjacent to each other.

The first lens element 810 with positive refractive power has an object-side surface 811 being convex in a paraxial region thereof and an image-side surface 812 being convex in a paraxial region thereof. The first lens element 810 is made of a plastic material, and has the object-side surface 811 and the image-side surface 812 being both aspheric.

The second lens element 820 with positive refractive power has an object-side surface 821 being concave in a paraxial region thereof and an image-side surface 822 being convex in a paraxial region thereof. The second lens element 820 is made of a plastic material, and has the object-side surface 821 and the image-side surface 822 being both aspheric.

The third lens element 830 with negative refractive power has an object-side surface 831 being convex in a paraxial region thereof and an image-side surface 832 being concave in a paraxial region thereof. The third lens element 830 is made of a plastic material, and has the object-side surface 831 and the image-side surface 832 being both aspheric.

The fourth lens element 840 with positive refractive power has an object-side surface 841 being convex in a paraxial region thereof and an image-side surface 842 being concave in a paraxial region thereof. The fourth lens element 840 is made of a plastic material, and has the object-side surface 841 and the image-side surface 842 being both aspheric. Furthermore, the image-side surface 842 of the fourth lens element 840 includes at least one convex shape in an off-axial region thereof.

The fifth lens element 850 with positive refractive power has an object-side surface 851 being concave in a paraxial region thereof and an image-side surface 852 being convex in a paraxial region thereof. The fifth lens element 850 is made of a plastic material, and has the object-side surface 851 and the image-side surface 852 being both aspheric.

The sixth lens element 860 with negative refractive power has an object-side surface 861 being convex in a paraxial region thereof and an image-side surface 862 being concave in a paraxial region thereof. The sixth lens element 860 is made of a plastic material, and has the object-side surface 861 and the image-side surface 862 being both aspheric. Furthermore, the image-side surface 862 of the sixth lens element 860 includes at least one convex shape in an off-axial region thereof.

The IR-cut filter 870 is made of a glass material and located between the sixth lens element 860 and the image surface 880, and will not affect the focal length of the optical image lens assembly.

The detailed optical data of the 8th embodiment are shown in Table 15 and the aspheric surface data are shown in Table 16 below.

TABLE 15

8th Embodiment
f = 3.29 mm, Fno = 2.22, HFOV = 41.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.043 | | | | |
| 2 | Lens 1 | 2.960 | ASP | 0.400 | Plastic | 1.544 | 55.9 | 4.40 |
| 3 | | −11.862 | ASP | 0.030 | | | | |
| 4 | Lens 2 | −32.493 | ASP | 0.516 | Plastic | 1.544 | 55.9 | 6.50 |
| 5 | | −3.208 | ASP | 0.050 | | | | |
| 6 | Lens 3 | 3.967 | ASP | 0.240 | Plastic | 1.660 | 20.4 | −5.10 |
| 7 | | 1.778 | ASP | 0.397 | | | | |
| 8 | Lens 4 | 5.046 | ASP | 0.264 | Plastic | 1.639 | 23.5 | 138.77 |
| 9 | | 5.242 | ASP | 0.332 | | | | |
| 10 | Lens 5 | −76.201 | ASP | 0.652 | Plastic | 1.544 | 55.9 | 2.48 |
| 11 | | −1.328 | ASP | 0.351 | | | | |
| 12 | Lens 6 | 2.529 | ASP | 0.320 | Plastic | 1.544 | 55.9 | −1.90 |
| 13 | | 0.702 | ASP | 0.400 | | | | |
| 14 | IR-cut filter | Plano | | 0.210 | Glass | 1.517 | 64.2 | — |
| 15 | | Plano | | 0.254 | | | | |
| 16 | Image | Plano | | — | | | | |

Reference wavelength is 587.6 nm (d-line).

TABLE 16

| Aspheric Coefficients | | | | | | |
|---|---|---|---|---|---|---|
| Surface # | 2 | 3 | 4 | 5 | 6 | 7 |
| k = | −1.1191E+01 | −5.1448E+00 | −4.0466E+01 | −6.4952E+01 | −1.9137E+01 | 2.4372E−01 |
| A4 = | −5.5418E−02 | −2.1487E−01 | −7.5396E−02 | −2.2352E−01 | −1.5720E−01 | −2.1598E−01 |
| A6 = | −3.9164E−02 | 3.7182E−01 | 3.8424E−01 | 5.3300E−01 | 1.9750E−01 | 2.4977E−01 |
| A8 = | −3.2376E−01 | −2.3442E−01 | −2.5733E−02 | −1.1428E+00 | −4.8363E−01 | −3.8034E−01 |
| A10 = | 9.3809E−01 | 8.7399E−02 | −4.3303E−01 | 1.6575E+00 | 8.9133E−01 | 4.7185E−01 |
| A12 = | −1.1734E+00 | −1.6323E−01 | 3.2092E−01 | −1.3004E+00 | −7.8094E−01 | −3.1876E−01 |
| A14 = | 6.1527E−01 | 1.2622E−01 | −6.4058E−02 | 3.9534E−01 | 2.4965E−01 | 8.5993E−02 |
| Surface # | 8 | 9 | 10 | 11 | 12 | 13 |
| k = | 1.9977E−01 | 5.5806E+00 | −1.0001E+00 | −1.5413E+00 | −9.0000E+01 | −5.1191E+00 |
| A4 = | −5.6465E−02 | 1.9136E−02 | 2.7675E−01 | 3.5799E−01 | −1.8875E−01 | −1.0147E−01 |
| A6 = | −2.5889E−01 | −4.5395E−01 | −3.5814E−01 | −2.6890E−01 | 9.9525E−02 | 4.3791E−02 |
| A8 = | 6.2364E−01 | 6.8827E−01 | 2.2588E−01 | 8.2765E−02 | −1.3837E−01 | −1.6897E−02 |
| A10 = | −6.7568E−01 | −5.3274E−01 | −7.8624E−02 | −1.3616E−03 | 9.5851E−02 | 4.2777E−03 |
| A12 = | 3.5560E−01 | 2.0703E−01 | 1.0388E−02 | −5.0157E−03 | −2.9948E−02 | −6.1586E−04 |
| A14 = | −7.3054E−02 | −3.0898E−02 | 1.0372E−03 | 1.0902E−03 | 4.4107E−03 | 4.2780E−05 |
| A16 = | | 3.5438E−04 | −2.8753E−04 | −7.3801E−05 | −2.5220E−04 | −1.0073E−06 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 3.29 | (R1 + R2)/(R1 − R2) | −0.60 |
| Fno | 2.22 | (R3 + R4)/(R3 − R4) | 1.22 |
| HFOV [deg.] | 41.5 | (R9 − R10)/(R9 + R10) | 0.97 |
| V3/V2 | 0.36 | f/R1 + f/|R2| | 1.39 |
| (V3 + V6)/V5 | 1.36 | |f2/f3| | 1.27 |
| CT2/T12 | 17.20 | |f3/f4| | 0.04 |
| Td/ΣAT | 3.06 | f1/f2 | 0.68 |
| ImgH/f | 0.89 | | |

Furthermore, according to the 8th embodiment, when the focal length of the first lens element 810 is f1, the focal length of the second lens element 820 is f2, the focal length of the third lens element 830 is f3, the focal length of the fourth lens element 840 is f4, a focal length of the fifth lens element 850 is f5, and a focal length of the sixth lens element 860 is f6, the following conditions are satisfied: |f1|<|f4|; |f2|<|f4|; |f3|<|f4|; |f5|<|f4|; and |f6|<|f4|.

9th Embodiment

Figure 17:
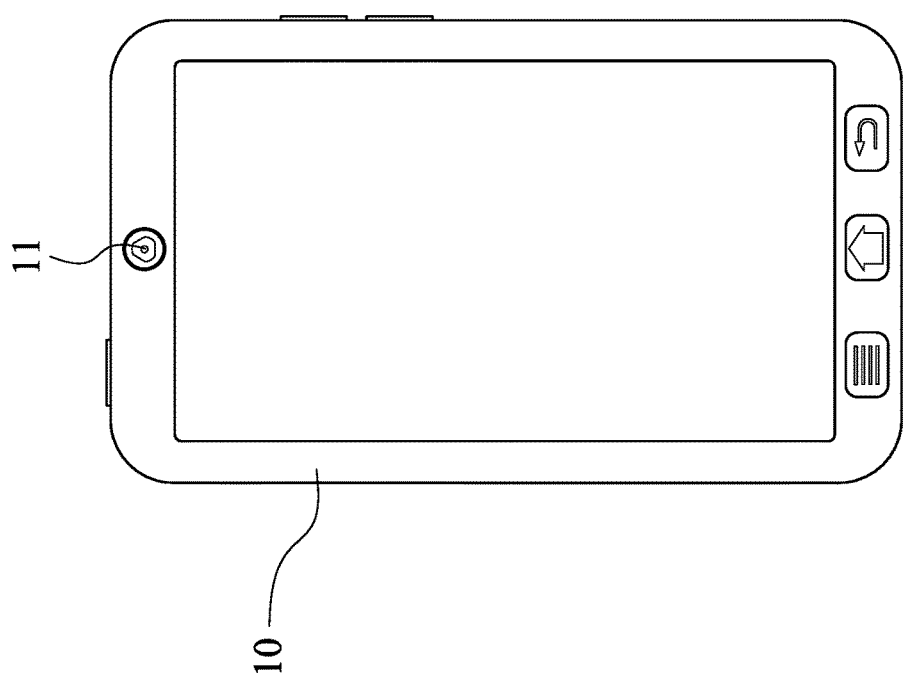
FIG. 17 is a schematic view of an electronic device according to the 9th embodiment of the present disclosure.

FIG. 17 is a schematic view of an electronic device 10 according to the is 9th embodiment of the present disclosure. The electronic device 10 of the 9th embodiment is a smartphone, wherein the electronic device 10 includes an image capturing device 11. The image capturing device 11 includes an optical image lens assembly (its reference numeral is omitted) according to the present disclosure and an image sensor (its reference numeral is omitted), wherein the image sensor is disposed on an image surface of the optical image lens assembly.

10th Embodiment

Figure 18:
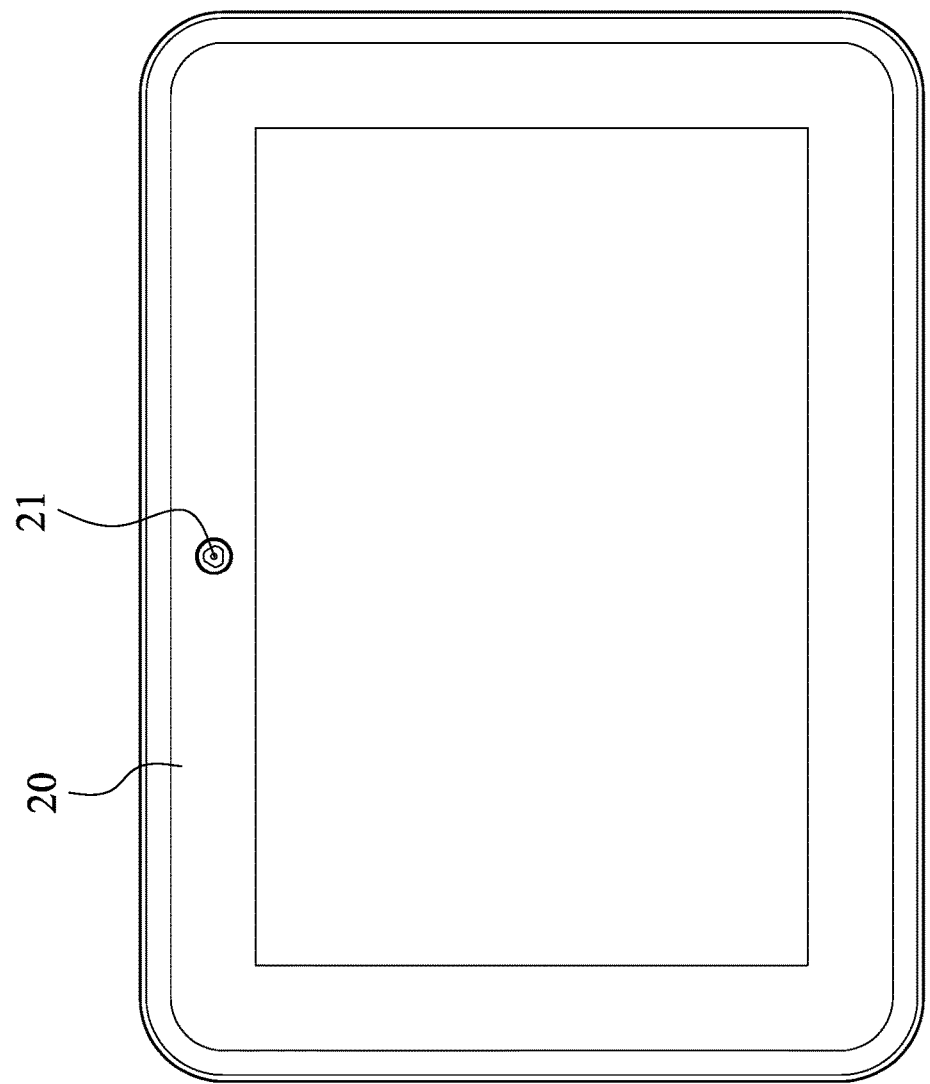
FIG. 18 is a schematic view of an electronic device according to the 10th embodiment of the present disclosure.

FIG. 18 is a schematic view of an electronic device 20 according to the 10th embodiment of the present disclosure. The electronic device 20 of the 10th embodiment is a tablet personal computer, wherein the electronic device 20 includes an image capturing device 21. The image capturing device 21 includes an optical image lens assembly (its reference numeral is omitted) according to the present disclosure and an image sensor (its reference numeral is omitted), wherein the image sensor is disposed on an image surface of the optical image lens assembly.

11th Embodiment

Figure 19:
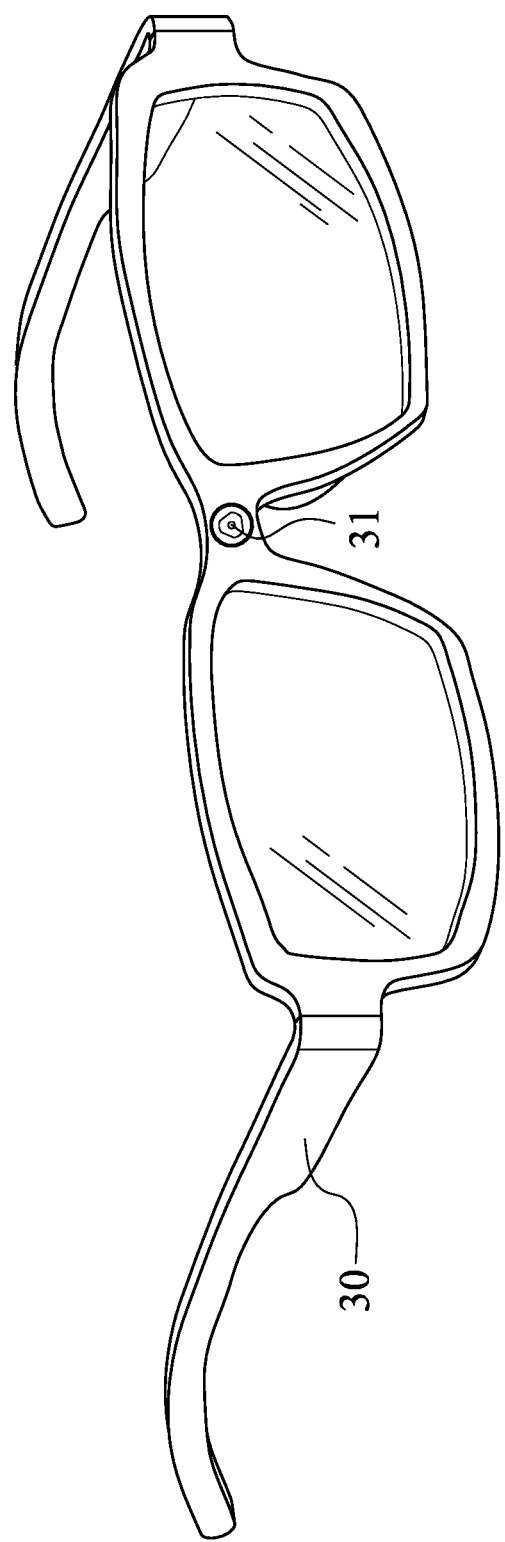
FIG. 19 is a schematic view of an electronic device according to the 11th embodiment of the present disclosure.

FIG. 19 is a schematic view of an electronic device 30 according to the 11th embodiment of the present disclosure. The electronic device 30 of the 11th embodiment is a wearable device, wherein the electronic device 30 includes an image capturing device 31. The image capturing device 31 includes an optical image lens assembly (its reference numeral is omitted) according to the present disclosure and an image sensor (its reference numeral is omitted), wherein the image sensor is disposed on an image surface of the optical image lens assembly.

The foregoing description, for purpose of explanation, has been described with reference to specific embodiments. It is to be noted that Tables 1-16 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical image lens assembly comprising, in order from an object side to an image side:
   a first lens element with positive refractive power having an object-side surface being convex in a paraxial region thereof;
   a second lens element with positive refractive power having an image-side surface being convex in a paraxial region thereof;
   a third lens element;
   a fourth lens element having an image-side surface being concave in a paraxial region thereof;
   a fifth lens element with positive refractive power having an object-side surface being concave in a paraxial region thereof and an image-side surface being convex in a paraxial region thereof, wherein the object-side surface and the image-side surface of the fifth lens element are aspheric; and
   a sixth lens element with negative refractive power having an image-side surface being concave in a paraxial region thereof, wherein an object-side surface and the image-side surface of the sixth lens element are aspheric, and the image-side surface of the sixth lens element comprises at least one convex shape in an off-axial region thereof;
   wherein the optical image lens assembly has a total of six lens elements, there is an air space between every two lens elements of the first lens element, the second lens element, the third lens element, the fourth lens element, the fifth lens element and the sixth lens element that are adjacent to each other, a curvature radius of an object-side surface of the second lens element is R3, a curvature radius of the image-side surface of the second lens element is R4, a focal length of the second lens element is f2, a focal length of the third lens element is f3, a focal length of the fourth lens element is f4, an axial distance between the object-side surface of the first lens element and the image-side surface of the sixth lens element is Td, a sum of axial distances between every two of the lens elements of the optical image lens assembly that are adjacent to each other is ΣAT, and the following conditions are satisfied:

$0.53 \leq (R3+R4)/(R3-R4)$;

$|f2/f3| < 3.0$;

$|f3/f4| < 10$; and $4.48 \leq Td/\Sigma AT < 20$.

2. The optical image lens assembly of claim 1, wherein the third lens element with negative refractive power has an object-side surface being convex in a paraxial region thereof and an image-side surface being concave in a paraxial region thereof, and the object-side surface and the image-side surface of the third lens element are aspheric.

3. The optical image lens assembly of claim 1, wherein the first lens element has an image-side surface being concave in a paraxial region thereof, a curvature radius of the object-side surface of the first lens element is R1, a curvature radius of the image-side surface of the first lens element is R2, and the following condition is satisfied:

$(R1+R2)/(R1-R2) < -1.60$.

4. The optical image lens assembly of claim 1, wherein the following condition is satisfied:

$0 < |f2/f3| < 1.50$.

5. The optical image lens assembly of claim 1, wherein the image-side surface of the fourth lens element comprises at least one convex shape in an off-axial region thereof.

6. The optical image lens assembly of claim 1, wherein the third lens element has an image-side surface comprising at least one convex shape in an off-axial region thereof.

7. The optical image lens assembly of claim 1, wherein a focal length of the first lens element is f1, and the following condition is satisfied:

$0.50 < f1/f2 < 2.0$.

8. The optical image lens assembly of claim 1, wherein a curvature radius of the object-side surface of the fifth lens element is R9, a curvature radius of the image-side surface of the fifth lens element is R10, and the following condition is satisfied:

$0 < (R9-R10)/(R9+R10) < 0.75$.

9. The optical image lens assembly of claim 1, wherein a focal length of the first lens element is f1, a focal length of the fifth lens element is f5, a focal length of the sixth lens element is f6, and the following conditions are satisfied:

$|f1| < |f4|$;

$|f2| < |f4|$;

$|f3| < |f4|$;

$|f5| < |f4|$; and $|f6| < |f4|$.

10. The optical image lens assembly of claim 1, wherein the following condition is satisfied:

$|f3/f4| < 2.0$.

11. The optical image lens assembly of claim 1, wherein the following condition is satisfied:

$0.80 < (R3+R4)/(R3-R4) < 4.0$.

12. The optical image lens assembly of claim 1, wherein a central thickness of the second lens element is CT2, an axial distance between the first lens element and the second lens element is T12, and the following condition is satisfied:

$0 < CT2/T12 < 5.0$.

13. The optical image lens assembly of claim 1, wherein an Abbe number of the second lens element is V2, an Abbe number of the third lens element is V3, and the following condition is satisfied:

$0.20 < V3/V2 < 0.60$.

14. The optical image lens assembly of claim 1, wherein a focal length of the optical image lens assembly is f, a curvature radius of the object-side surface of the first lens element is R1, a curvature radius of an image-side surface of the first lens element is R2, and the following condition is satisfied:

$1.0 < f/R1 + f/R2 < 5.0$.

15. An image capturing device, comprising:
    the optical image lens assembly of claim 1; and
    an image sensor, wherein the image sensor is disposed on an image surface of the optical image lens assembly.

16. An electronic device, comprising:
    the image capturing device of claim 15.

* * * * *